(12) United States Patent
Leblanc

(10) Patent No.: US 11,875,906 B2
(45) Date of Patent: Jan. 16, 2024

(54) METHOD OF OPERATING A NUCLEAR POWER PLANT

(71) Applicant: Terrestrial Energy Inc., Oakville (CA)

(72) Inventor: David Leblanc, Ottawa (CA)

(73) Assignee: TERRESTRIAL ENERGY INC., Oakville (CA)

( * ) Notice: Subject to any disclaimer, the term of this patent is extended or adjusted under 35 U.S.C. 154(b) by 0 days.

(21) Appl. No.: 17/950,830

(22) Filed: Sep. 22, 2022

(65) Prior Publication Data

US 2023/0111998 A1    Apr. 13, 2023

Related U.S. Application Data

(60) Division of application No. 16/037,636, filed on Jul. 17, 2018, now Pat. No. 11,476,008, which is a
(Continued)

(51) Int. Cl.
*G21C 17/10* (2006.01)
*G21C 1/22* (2006.01)
(Continued)

(52) U.S. Cl.
CPC .............. *G21C 1/22* (2013.01); *G21C 1/322* (2013.01); *G21D 3/00* (2013.01); *G21D 9/00* (2013.01);
(Continued)

(58) Field of Classification Search
CPC ...... G21C 17/10; G21C 17/112; G21C 19/28; G21D 1/00; G21D 3/00; G21D 3/06
See application file for complete search history.

(56) References Cited

U.S. PATENT DOCUMENTS 3,136,700 A    6/1964  Poppendiek et al.
3,755,079 A *  8/1973  Weinstein .............. G21C 13/00
                                          976/DIG. 293
(Continued)

FOREIGN PATENT DOCUMENTS

CN       101939793 A    1/2011
DE         1589751 A1   3/1970
(Continued)

OTHER PUBLICATIONS

LeBlanc, David. "Molten Salt Reactors: A new vision for a Generation IV concept." Physics Department, Carleton University, Ottawa Ontario (2008). (Year: 2008).*
(Continued)

*Primary Examiner* — Lily C Garner
(74) *Attorney, Agent, or Firm* — MBM Intellectual Property Law LLP; Louis B. Allard

(57) ABSTRACT

The present relates to the integration of the primary functional elements of graphite moderator and reactor vessel and/or primary heat exchangers and/or control rods into an integral molten salt nuclear reactor (IMSR). Once the design life of the IMSR is reached, for example, in the range of 3 to 10 years, it is disconnected, removed and replaced as a unit. The spent IMSR functions as the medium or long term storage of the radioactive graphite and/or heat exchangers and/or control rods and/or fuel salt contained in the vessel of the IMSR. The present also relates to a nuclear reactor that has a buffer salt surrounding the nuclear vessel. During normal operation of the nuclear reactor, the nuclear reactor operates at a temperature that is lower than the melting point of the buffer salt and the buffer salt acts as a thermal insulator. Upon loss of external cooling, the temperature of the nuclear reactor increases and melts the buffer salt, which
(Continued)

can then transfer heat from the nuclear core to a cooled containment vessel.

19 Claims, 12 Drawing Sheets

Related U.S. Application Data division of application No. 14/451,703, filed on Aug. 5, 2014, now Pat. No. 10,056,160, which is a continuation-in-part of application No. PCT/CA2013/050090, filed on Feb. 6, 2013.

(60) Provisional application No. 61/862,378, filed on Aug. 5, 2013, provisional application No. 61/633,071, filed on Feb. 6, 2012.

(51) Int. Cl.

| | | |
|---|---|---|
| *G21C 1/32* | (2006.01) | |
| *G21D 3/00* | (2006.01) | |
| *G21D 9/00* | (2006.01) | |
| G21C 5/02 | (2006.01) | |
| G21C 17/112 | (2006.01) | |
| G21C 19/28 | (2006.01) | |
| G21D 1/00 | (2006.01) | |

(52) U.S. Cl.
CPC .............. *G21C 5/02* (2013.01); *G21C 17/112* (2013.01); *G21C 19/28* (2013.01); *G21D 1/00* (2013.01); *Y02E 30/30* (2013.01)

(56) References Cited

U.S. PATENT DOCUMENTS

| | | | | |
|---|---|---|---|---|
| 3,847,733 | A | 11/1974 | Ventre | |
| 3,881,989 | A * | 5/1975 | Cohen | G21C 17/04 376/253 |
| 4,045,286 | A * | 8/1977 | Blum | G21C 1/32 376/288 |
| 4,186,049 | A * | 1/1980 | Blum | G21C 13/0875 976/DIG. 200 |
| 6,259,760 | B1 | 7/2001 | Carelli et al. | |
| 8,493,561 | B2 * | 7/2013 | Park | G01N 21/31 356/326 |
| 8,594,268 | B2 * | 11/2013 | Shu | G21C 5/02 376/403 |
| 9,881,700 | B2 * | 1/2018 | Leblanc | G21C 5/12 |
| 2009/0279658 | A1 * | 11/2009 | Leblanc | G21C 3/22 376/360 |
| 2010/0296620 | A1 | 11/2010 | Peterson | |

FOREIGN PATENT DOCUMENTS

| | | | | |
|---|---|---|---|---|
| EP | 0308691 | A1 | 3/1989 | |
| EP | 1622168 | A1 | 2/2006 | |
| EP | 2815404 | A1 * | 12/2014 | ............... G21C 1/03 |
| GB | 856946 | A | 12/1960 | |
| JP | S571991 | A | 1/1982 | |
| JP | S5744885 | A | 3/1982 | |
| JP | S6249291 | A | 3/1987 | |
| JP | S62130384 | A | 6/1987 | |
| JP | H1184053 | A | 3/1993 | |
| JP | H10132994 | A | 5/1998 | |
| JP | 2002228794 | A | 8/2002 | |
| JP | 2004093143 | A | 3/2004 | |
| JP | 2006071323 | A | 3/2006 | |
| JP | 2011503614 | A | 1/2011 | |
| JP | 2011128129 | A | 6/2011 | |
| JP | 2012047531 | A | 3/2012 | |
| WO | 2009135286 | A1 | 11/2009 | |
| WO | 2010129836 | A1 | 11/2010 | |
| WO | 2012135957 | A1 | 11/2012 | |
| WO | 2013116942 | A1 | 8/2013 | |

OTHER PUBLICATIONS

Canadian Patent Application No. 2,957,259, Office Action dated Mar. 29, 2021.
Communication under Rule 71(3) European application No. 14833741.3, dated Feb. 5, 2018, 6 pages.
Eurasian Patent Application No. 201491488/31, Office Action dated Dec. 5, 2017—English Translation Available.
Israeli Patent Application No. 233949, Office Action dated May 31, 2018—English Translation Available.
Brazilian Patent Application No. BR112014019311-8, Office Action dated Feb. 20, 2020—English Translation Not Available.
Brazilian Patent Application No. BR112014019311-8, Office Action dated Aug. 5, 2020—English Translation Not Available.
Brazilian Patent Application No. BR112014019311-8, Office Action dated Nov. 26, 2020—English Translation Not Available.
Canadian Patent Application No. 2,863,845, Office Action dated Dec. 17, 2019.
Canadian Patent Application No. 2,957,259, Office Action dated Aug. 28, 2020.
Israeli Patent Application No. 233949, Office Action dated Sep. 2, 2019—English Translation Available.
Japanese Patent Application No. 2017-212946, Decision to Grant dated Jan. 21, 2020—English Translation Not Available.
Korean Patent Application No. 10-2014-7024993, Notice of Allowance dated Mar. 10, 2020—English Translation Available.
Korean Patent Application No. 10-2014-7024993, Office Action dated Nov. 14, 2019—English Translation Available.
Indian Patent Application No. IN6381/DELNP/2014A, Office Action dated May 20, 2019.
Indonesian Patent Application No. IDP-00201405164, Notice of Allowance dated Jul. 17, 2019 —English Translation Available.
Japanese Patent Application No. JP2017-212946, Office Action dated Aug. 7, 2019—English Translation not Available.
Korean Patent Application No. 10-2014-7024993, Office Action dated May 29, 2019—English Translation Available.
Australian Patent Application No. 2013218764, Examination Report No. 1 dated Sep. 3, 2015.
Australian Patent Application No. 2013218764, Notice of Acceptance dated Aug. 16, 2016.
Canadian Patent Application No. 2,863,845, Office Action dated Dec. 11, 2018.
Chinese Patent Application No. 201710107064.5, Office Action dated Aug. 3, 2018—English Translation Available.
Chinese Patent Application No. 201380018826, Office Action dated Dec. 17, 2015—English Translation Available.
Chinese Patent Application No. 201380018826.4, Notice of Grant dated Dec. 15, 2016.
Chinese Patent Application No. CN201380018826, Second Office Action dated Aug. 10, 2016—English Translation available.
Eurasian Patent Application No. 201491488/31, Office Action dated Aug. 22, 2018—English Translation Available.
Eurasian Patent Application No. 201491488, Office Action dated June 2, 2016—English Translation Available.
Eurasian Patent Application No. 201491488/31, Office Action dated Mar. 13, 2017 with English Translation.
European Patent Application No. 13746701, Intention to Grant dated Mar. 15, 2017.
European Patent Application No. 13746701, Partial Supplementary European Search Report dated Oct. 20, 2015.
European Patent Application No. 13746701, Supplementary European Search Report dated Feb. 5, 2016.
European Patent Application No. 14833741, Extended European Search Report dated Feb. 13, 2017.
International Patent Application No. PCT/CA2013/050090, International Preliminary Report on Patentability dated Aug. 21, 2014.
International Patent Application No. PCT/CA2013/050090, International Search Report dated May 7, 2013.

(56) References Cited

OTHER PUBLICATIONS

International Patent Application No. PCT/CA2014/050733, International Preliminary Report on Patentability dated Feb. 18, 2016.
International Patent Application No. PCT/CA2014/050733, International Search Report dated Oct. 29, 2014.
Japanese Patent Application No. 2017-212946, Office Action dated Sep. 25, 2018—English Translation Available.
Japanese Patent Application No. JP2014-555052, Office Action dated Jul. 4, 2017—English Translation Available.
Japanese Patent Application No. JP2014-555052, Office Action dated Oct. 18, 2016—English Translation Available.
Kasten et al., "Design Studies of 1000-Mw(e) Molten-Salt Breeder Reactors," ORNL-3996, Aug. 1966, pp. 1-186.
Kuznetsov et al., "Status of Small Reactor Designs Without On-Site Refuelling," International Atomic Energy Agency, Jan. 2007, 870 pages.
Malaysian Patent Application No. MYPI2014002229, Office Action dated Aug. 15, 2017.
Singapore Application No. SG11201404694T, Supplementary Examination Report dated Sep. 13, 2016.
Singapore Patent Application No. SG11201404694T, Notice of Eligibility for Grant dated Sep. 23, 2016.
U.S. Appl. No. 14/451,703, Notice of Allowance dated May 1, 2018.
U.S. Appl. No. 14/451,703, Office Action dated Sep. 19, 2017.
Written Opinion for Application No. PCT/CA2013/050090, dated May 7, 2013, 5 pages.
Written Opinion for Application No. PCT/CA2014/050733, dated Oct. 29, 2014, 5 pages.
Zhang et al., "Steady Thermal-Hydraulic Analysis for the Core of a New Concept Molten Salt Reactor," The Journal of Engineering Thermophysics, Jun. 2008, vol. 29 (6), pp. 979-982.

\* cited by examiner

METHOD OF OPERATING A NUCLEAR POWER PLANT

CROSS-REFERENCE TO RELATED APPLICATIONS

This application is a divisional of U.S. patent application Ser. No. 16/037,636 filed Jul. 17, 2018, which is a divisional of U.S. patent application Ser. No. 14/451,703 filed Aug. 5, 2014, which is continuation-in-part of International Patent Application No. PCT/CA2013/050090 filed Feb. 6, 2013, which claims the benefit of U.S. Provisional Application No. 61/633,071 filed Feb. 6, 2012. U.S. patent application Ser. No. 14/451,703 claims the benefit of U.S. Provisional Application 61/862,378 filed on Aug. 5, 2013. The entire content of the foregoing applications is incorporated by reference in the present application.

FIELD

The present disclosure relates generally to nuclear reactors. More particularly, the present disclosure relates to molten salt nuclear reactors.

BACKGROUND

Molten salt reactors (MSRs) were primarily developed from the 1950s to 1970s but, as of late, there has been increasing world interest in this type of reactor. Older concepts are being re-evaluated and new ideas put forth. This class of nuclear reactor has a great deal of advantages over current nuclear reactors, the advantages including potentially lower capital costs, overall safety, long lived waste profile and resource sustainability.

With MSRs advantages also come some significant technological challenges which lead to difficult basic design decisions. The first and likely foremost is whether and how a neutron moderator may be employed. Graphite has, in almost all cases, been chosen as a moderator as it behaves very well in contact with the fluoride salts used in MSRs. These salts are eutectic mixtures of fissile and fertile fluorides ($UF_4$, $ThF_4$, $PuF_3$, etc.) with other carrier salts such as LiF, $BeF_2$ or NaF. Using graphite as a bulk moderator within the core of the MSR has many advantages. For example, it gives a softer or more thermalized neutron spectrum which provides improved reactor control and a greatly lowered starting fissile inventory. As well, using graphite throughout the core of a MSR allows the ability to employ what is known as an undermoderated outer zone which acts as a net absorber of neutrons and helps shield the outer reactor vessel wall from damaging neutron exposure. The vessel, which contains the nuclear core, has typically been proposed as being made of a high nickel alloy such as Hastelloy® N; however, other materials are possible.

The use of graphite within the core of the MSR (i.e., within the neutron flux of a MSR) can have a serious drawback however. That is, that graphite will first shrink and then expand beyond its original volume as it is exposed to a fast neutron flux. Overall expansion of graphite (graphite core) occurs when the volume of the graphite (graphite core) is larger than its original volume, i.e., the volume preceding any neutron irradiation. An upper limit of total fast neutron fluence can be calculated and operation of the MSR is such that this limit is not exceeded. This limit determines when the graphite would begin to expand beyond its original volume and potentially damage surrounding graphite elements or the reactor vessel itself. How long graphite can be used within the reactor core is thus directly related to the local power density and thus to the fast neutron flux it experiences. A low power density core may be able to use the same graphite for several decades. This is the case for many previous reactors employing graphite such as the British gas cooled Magnox and AGR reactors. They were extremely large and had a low power density for thermohydraulic reasons but, this permitted an extremely long graphite lifetime. However, MSRs would benefit from having a far higher power density and thus graphite lifetime can become an issue.

The scientists and engineers designing MSRs have long been faced with important design options. A first option is to simply design the reactor to be quite large and very low power density in order to get a full 30 year or more lifetime out of the graphite. Thus one can seal all the graphite within the vessel and the graphite can remain in the vessel for the design life of the nuclear plant. Examples of this choice can be found in the studies of Oak Ridge National Laboratories (ORNL) in the late 1970s and early 1980s. For example, ORNL™ 7207 proposes a 1000 MWe reactor which was termed the "30 Year Once Through" design which would have a large reactor vessel of approximately 10 meters in diameter and height in order to avoid the need for graphite replacement. Much of the later work by Dr. Kazuo Furukawa of Japan, on what are known as the FUJI series of reactor designs, also chose this route of large, low power nuclear cores. These very large cores have obvious economic disadvantages in terms of the sheer amount of material required to fabricate the core and reactor vessel, and in the excessive weight of the core. These challenges increase the cost and complexity of the surrounding reactor building as would be understood by those trained in the field. It should be added that a 30 year nuclear plant lifetime was quite acceptable in the 1970s but by today's standards would be thought short. 50 or 60 years is now desired and would mean a still larger core to allow this lifetime without graphite replacement.

A second option often proposed is to employ a much smaller, higher power density core but to plan for periodic replacement of the graphite. This approach was commonly assumed in the work at Oak Ridge National Laboratories (ORNL) in the design of the Molten Salt Breeder Reactor from about 1968 to 1976 before the program was cancelled. This 1000 MWe reactor design had an outer vessel of Hastelloy® N that would contain hundreds of graphite elements fitting together and filling the vessel but with passage channels for the molten salt fuel to flow and exit the core to external heat exchangers. In this second option, the reactor has much smaller dimensions which are of approximately 6 meters in diameter and height. In this case the graphite, particularly in the center of the core with the highest fast neutron flux, only had an expected lifetime of 4 years. Thus the reactor had to be designed to be shut down and opened up every 4 years to replace a large fraction of the graphite elements. This may not sound overly difficult to those not trained in the field but with molten salts, the fission products, some of which are relatively volatile, are in the fuel salt and can also embed themselves onto a surface layer of graphite and, for example, the inner metal surfaces of the reactor vessel. Thus just opening the reactor vessel was known to be an operation that could be difficult to perform without allowing radioactive elements to spread into the surrounding containment zone. As well, the design of the reactor vessel itself is more complex when it needs to be periodically opened. These challenges are why the route of larger, lower power density cores were often chosen.

A third option is to try to omit the use of graphite altogether. This is possible and results in reactors typically with a much harder neutron spectrum. An example of this choice is the Molten Salt Fast Reactor (MSFR) proposed by a consortium of French and other European researchers starting around year 2005. It has very serious drawbacks however For example it requires upwards of five times the starting fissile load and any accidental exposure of the salt to a moderator, such as water or even hydrogen content in concrete, could lead to criticality dangers.

Beyond the issue of graphite lifetime, there are also the somewhat related issues of the lifetime of the reactor vessel itself and of the primary heat exchangers.

The reactor vessel wall may also have a limited lifetime due to neutron fluence with both thermal and fast neutrons potentially causing problems. The most commonly proposed material being a high nickel alloy, such as Hastelloy® N, with reasonably well understood behaviour and allowed limits of neutron fluence. As such, a great deal of effort goes into core design to limit the exposure of neutrons and/or lower the operating temperature of the vessel wall. As well, adding thickness to the wall may help as strength is lost with increased neutron exposure. This adds both weight and expense. It is thus a challenge to have a 30 to 60 year lifetime of the reactor vessel itself.

Another design challenge is the primary heat exchangers which transfer heat from the radioactive primary fuel salt to a secondary coolant salt. This coolant salt then typically transfers heat to a working media such as steam, helium, $CO_2$ etc. In some cases these heat exchangers are outside or external the reactor vessel itself, which appears to be the case for all 1950s to 1980s ORNL designs. They also may be located within the reactor vessel itself which has its own set of advantages and challenges. One great advantage of internal heat exchangers is no radiation of significance need leave the reactor itself as only secondary coolant salt enters and leaves the vessel.

For both internal and external heat exchangers, the great challenge is in either servicing or replacing them. When a MSR is opened up, it can potentially lead to radioactivity being released into a containment zone or space, ORNL for example proposed common tube in shell heat exchangers external to the core, four heat exchanger units per 1000 MWe reactor. In the case of any tube leaks the operation was not to fix or plug tubes but to open the shell and remove the entire tube bundle and replace with a new bundle. Only after a cooling period would a decision be made on repair and reuse of the bundle or simple disposal. Thus it is clear that primary heat exchanger service and/or replacement techniques are a great challenge in MSR design.

Further, when either graphite or heat exchangers are replaced, then the issue of their safe storage must be also addressed as they will become significantly radioactive during operation. This represents yet another challenge in MSR overall plant design.

It should be further highlighted that the related nuclear design field of Fluoride salt cooled, High temperature Reactors (known as FHRs) has very similar issues. In this work the reactor design can be very similar but instead of the fuel being in the fluoride salt, it is in solid form within the graphite moderator using the fuel form known as TRISO. In this case the limited graphite lifetime is also a function of the lifetime of the solid TRISO fuels; however, all other design issues and challenges are very similar to MSR design work. In FHRs, the primary coolant salt is not nearly as radioactive but does typically contain some radioactive elements such as tritium and a similar set of challenges are present when planning to use solid block TRISO fuels and periodically replace them. A subset of FHR design involves using a pebble fuel form which does ease fuel replacement without opening up the reactor vessel; however, this type of design has its own set of issues The decay heat that follows the shutdown of a nuclear reactor following the loss of external cooling has been a long-standing industry challenge. The incident at Fukushima Japan indicates the seriousness of the issue. If the decay heat is not removed quickly from the reactor, the temperature in the reactor rises to unacceptable levels. Thus the speed with which the initial decay heat can be removed from the reactor is critical.

Therefore, improvements in nuclear reactors are desirable.

SUMMARY

The present disclosure relates to the integration of the primary functional elements of graphite moderator and reactor vessel and/or primary heat exchangers and/or control rods into a single replaceable unit having a higher and more economic power density while retaining the advantages of a sealed unit. Once the design life of such an Integral Molten Salt Reactor (IMSR) is reached, for example, in the range of 3 to 10 years it is disconnected, removed and replaced as a unit and this unit itself may also potentially function as the medium or long term storage of the radioactive graphite and/or heat exchangers and/or control rods and/or fuel salt itself. The functions of decay heat removal and volatile off gas storage may also be integrated in situ.

The present disclosure also relates to nuclear reactor that has a reactor vessel surrounded by a buffer material. The buffer material can absorb decay heat when external cooling is lost. The absorption of decay heat is effected by the buffer material phase transition latent heat, the phase transition being that of solid phase to liquid phase. The absorption is also effected by convective heat transfer when the buffer material is in the liquid state. The convective heat transfer occurs between the reactor vessel and a heat sink in thermal contact with the buffer material.

In a first aspect of the disclosure, there is provided a method of operating a nuclear power plant, the nuclear power plant comprising a molten salt reactor (MSR) to produce heat, a heat exchanger system, and an end use system, the heat exchanger system to receive heat produced by the MSR and to provide the received heat to the end use system. The method comprises operating the MSR, the MSR comprising a vessel, a graphite moderator core positioned in the vessel, and a molten salt circulating at least in the vessel, the heat exchanger system having an inside portion located inside the vessel and an outside portion located outside the vessel, the inside portion having a plurality of heat exchangers, each heat exchanger having an inlet conduit and an outlet conduit, each inlet conduit and each outlet conduit extending from each respective heat exchanger, through the vessel, toward the outside portion of the heat exchanger system and connecting each respective heat exchanger to the outside portion of the heat exchanger system, the vessel being sealed to permanently integrate the graphite core into the vessel. The method also comprises shutting down the MSR in response to a shutdown event occurring, to obtain a shut-down MSR. The method also comprises severing any operational connection between the inlet conduits and the outlet conduits of the shut-down MSR and the outside portion of the heat exchanger system, to obtain a severed, shut-down MSR; sequestering the severed, shut-down MSR;

and operationally connecting a replacement MSR to the outside portion of the heat exchanger system located outside the vessel of the replacement MSR.

In a second aspect of the present disclosure, there is provided a method of operating a nuclear power plant, the nuclear power plant comprising a molten salt reactor (MSR) to produce heat, a heat exchanger system, and an end use system, the heat exchanger system to receive heat produced by the MSR and to provide the received heat to the end use system. The method comprises operating the MSR, the MSR comprising a vessel, a graphite moderator core positioned in the vessel, and a molten salt circulating at least in the vessel, the heat exchanger system to receive heat from the molten salt. The method also comprises shutting down the MSR after a pre-determined duration of operation, to obtain a shut-down MSR; severing any operational connection between the shut-down MSR and any portion of the heat exchanger system located outside the vessel, to obtain a severed, shut-down MSR; sequestering the severed, shut-down MSR; and operationally connecting a replacement MSR to any portion of the heat exchanger system located outside the vessel of the replacement MSR.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached figures

DETAILED DESCRIPTION

Figure 1A:
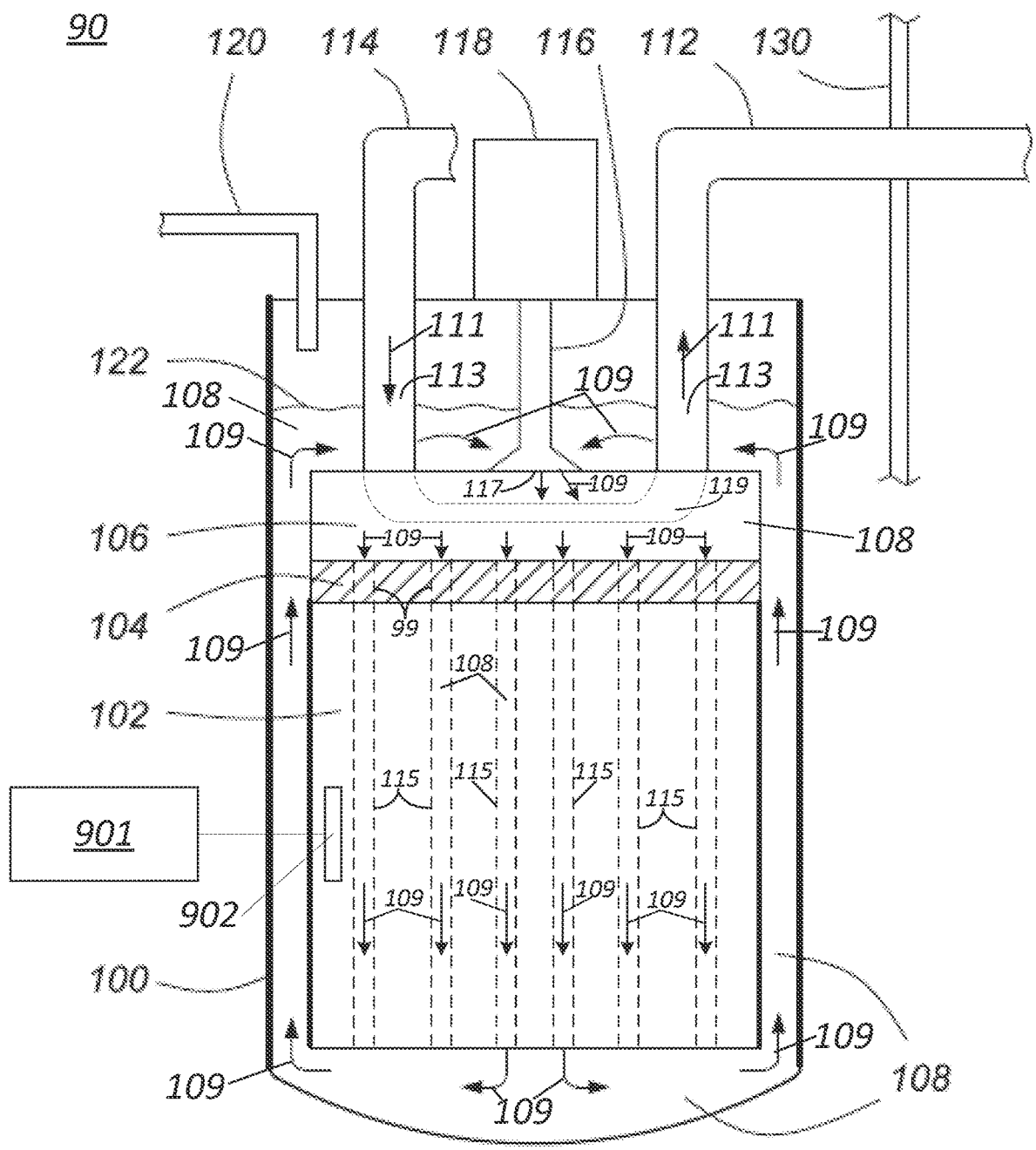
FIG. 1A shows an embodiment of a molten salt nuclear reactor in accordance with the present disclosure.

The present disclosure provides an integral Molten Salt Reactor (IMSR). The IMSR of the present disclosure has a graphite core that is permanently integrated with the vessel of the IMSR, which means that the graphite core is in the vessel of IMSR for the lifetime of the IMSR. As such, in the IMSR of the present disclosure, the graphite core is not a replaceable graphite core and remains within the IMSR for the operational lifetime of the IMSR. The graphite core is fixedly secured within the vessel of the IMSR. Advantageously, this eliminates the need for any apparatus that would be required for replacing the graphite core at pre-determined moments as per a pre-determined schedule. A further advantage is that the IMSR does not require any access port to allow access to the graphite core for replacement of the graphite core. An additional advantage of the IMSR of the present disclosure is that, after expiration of the design lifetime of the IMSR, the IMSR serves as a storage container for any radioactive matter within the IMSR. The components of the IMSR include the reactor vessel itself and any graphite elements of the nuclear core. Other components can include the primary heat exchangers which can be installed, in the reactor vessel, during fabrication of the IMSR. The IMSR is built to operate (produce electricity) for a design lifetime, which takes into account the reactor's graphite core expansion over time and the structural integrity of the graphite core. That is, as mentioned above in the background section, the graphite core will eventually expand beyond its original volume under neutron flux. Operation of MSRs in the presence of such expansion is not desirable as the graphite core can suffer breaks. The IMSR of the present disclosure is simply shut down and replaced after expiration of its design lifetime. Further components of the IMSR can include piping such as coolant salt inlet conduits and outlet conduits, and the pump shaft and impeller for moving (pumping) the coolant salt (primary coolant fluid) when a pump is employed.

In some embodiments of the present disclosure, an IMSR that has been shut down can simply remain in its containment zone (hot cell) that can act as a heat sink for the decay heat generated by the shut down IMSR. The decay heat simply radiates out the IMSR through the IMSR's vessel wall and into the containment zone and ultimately to the outside environment. MSRs typically operate at temperatures in the region of 700 degrees C., radiant heat is very effective in removing decay heat. Further, to accelerate decay heat removal, the IMSR of the present disclosure, a buffer salt can be added in the containment zone to surround the IMSR; this allows faster heat extraction from the IMSR to the containment zone. In certain embodiments the IMSR can have a frozen plug of salt that can be melted to allow the primary coolant drain to decay heat removal tanks.

In some other embodiment, during operation of the IMSR and after shut down of the IMSR, the IMSR can be a sealed unit that simply retains produced fission gases within the IMSR sealed vessel or, the fission gases can be release slowly to any suitable fission gases treatment system.

In the present disclosure, elements can be said to be operationally connected to each other when, for example, information in one element can be communicated to another element through a connection between the elements. The connection can be an electrical connection. Further, elements can be said to be operationally connected when state of one element can be controlled by, or related to a state of another element.

Further, in the present disclosure, elements can be said to be in fluid communication when fluid present at one element can flow to the other element.

FIG. 1A shows the frontal view of an embodiment of an IMSR 90 of the present disclosure. 100 is the reactor vessel itself, made of Hastelloy® N, a high nickel alloy, or any other suitable material such the molybdenum alloy TZM (titanium-zirconium-molybdenum alloy). The reactor vessel 100 can be referred to as a sealed reactor vessel in the sense that any graphite core within the reactor vessel 100 is sealed therein; that is, it meant to remain within the reactor vessel 100, and not be replaced during the operational lifetime of the IMSR. As the IMSR 100 of the present disclosure can have a short design life (e.g., 5 years), the walls of the reactor vessel 100 can be thinner than required for MSRs that have a 30+ year design life and can be allowed to operate in a much higher neutron fluence, or at a higher operating temperature than such long lifetime MSRs. 102 shows the core or core region which can be a simple mass of graphite defining channels 115 for a molten salt fuel 108 to flow through. The channels can also be referred to as through holes. The core 102 can also be referred to as core region, a graphite moderator core, and a graphite neutron moderator core. As the core 102 of the embodiment of FIG. 1A does not need to be replaced, the construction of the core 102 can be simplified in that it does require any structural features that would allow and/or facilitate its removal from the vessel 100 or its replacement. 104 shows a reflector (neutron reflector) to reflect neutrons toward the core 102 and to shield the primary heat exchanger unit 106 from excessive neutron flux. The reflector 104 can be optional. In the absence of the reflector 104 any metallic structure, for example, conduits and heat exchangers located in the IMSR above the core 102 would likely suffer neutron damage. The reflector 104 can be made of stainless steel as it serves no structural purpose so irradiation damage of the reflector 104 is of little concern. The reflector 104 has channels 99 or piping defined therein to allow the molten salt fuel 108 to flow from the primary heat exchanger unit 106 through the channels 115 defined by the core 102. The channels 115 can be varied in either diameter or lattice pitch in different areas of the core 102 to create, for example, an undermoderated region as well as an outer reflector zone in the graphite, as would be understood by those trained in the field. In the IMSR example of FIG. 1A, the flow of the molten salt fuel 108 in the vessel 100 is shown by the arrows 109.

The primary heat exchanger unit 106 has an opening 117 that receives the fuel salt 109 provided by the drive shaft and impeller unit 116, which is driven by a pump 118. The primary heat exchanger unit 106 contains a series of heat exchangers. Such a heat exchanger is shown at reference numeral 119. Each heat exchanger 119 is connected to an inlet conduit 114 and an outlet conduit 112 that propagate a coolant salt 113 (which can also be referred to as a secondary coolant salt) from the outside of the vessel 100, through the heat exchanger 119, to the outside of the vessel 100. The coolant salt 113 flows through the inlet conduit 114, heat exchanger 119, and outlet conduit 112 in the direction depicted by arrows 111. The coolant salt 113 receives heat from heat exchanger 119, which receives the heat from the fuel salt 108 that flows on, or circulates around, the heat exchanger 119. The secondary coolant salt 113 is pumped by a pump or pumping system (not shown). For clarity purposes, the heat exchanger 119 is shown as a straight conduit connecting the inlet conduit 114 to the outlet conduit; however, as would be understood by the skilled worker, the heat exchanger 119 can be of any suitable shape and can include any number of conduits connecting the inlet conduit 114 to the outlet conduit 112. As an example, a heat exchanger can have a manifold structure where coolant salt circulating in a main conduit is divided into a plurality of conduits stemming from the main conduit. Further, each heat exchanger can be individually shut down upon occurrence of a heat exchanger fault and the nuclear reactor can continue to operate with a reduced number of functioning heat exchangers.

The heat exchanger unit 106, the heat exchangers 119 it comprises, and the inlet conduits 114 and outlet conduits 112 connected to the heat exchangers 119 are all part of a heat exchanger system that is used to transfer heat from the IMSR to a system (an end use system) or apparatus such as, for example, a steam generator. Such a heat exchanger system is shown elsewhere in the disclosure, in relation to a nuclear power plant. The inlet conduits 114 and the outlet conduits 112 are operationally connected to a pump system—not shown—which is also part of the heat exchanger system. That is, the pump system circulates the coolant salt through the inlet conduits 114, the outlet conduits 112, and the heat exchangers 119. The inlet conduits 114 and the outlet conduits 112 can be operationally connected to additional heat exchangers that provide the heat of the coolant salt circulating the heat exchangers 119, the inlet conduits 114 and the outlet conduits 112 to another medium, such as, for example, another fluid such as water.

In the example of FIG. 1A, the heat exchanger system is partly comprised in the vessel 100 as the heat exchangers 119 and a portion of inlet conduit 114 and the inlet conduit 112 are inside the vessel 100. Further, the heat exchanger system is partly outside the vessel 100 in that another portion of the inlet conduit 114 and the outlet conduit 112 are outside the vessel 100, as are the aforementioned pump system and any additional heat exchanger. That is to say, that the heat exchanger system has an inside portion located inside the vessel 100, and an outside portion located outside the vessel 100.

Also in the example of FIG. 1A, the molten fuel salt circulates only in the vessel 100. That is, under normal operating conditions, that is, conditions in which no break in equipment occurs, the molten fuel salt 108 does not leave the vessel 100.

The IMSR 90 is positioned in a hot cell whose function is to prevent radiation or radioactive elements, present or generated in the IMSR 90, from traversing the hot cell walls. Such a hot cell cell wall is partly shown at reference numeral 130. The outlet conduit 112, and the inlet conduit 114, can pass through openings in the hot cell wall 130 and can reach a secondary heat exchanger (not depicted) giving heat to either a third loop of working fluid or to the final working media such as steam or gas.

The level of molten fuel salt 108 within the reactor vessel is depicted by reference numeral 122. Fission gasses will collect above this liquid level 112 and may be retained in the vessel 100 or be allowed to transit, through an off gas line 120, to an off gas sequestration area (not depicted). These off gasses can be moved to the sequestration area by a helium entrainment system (not depicted).

An example of the dimensions of the IMSR of FIG. 1A may be 3.5 meters in diameter, 7-9 meters in height, and may provide a total power of 400 MW$_{thermal}$ (up to about 200 MW$_{electrical}$) This power density would give a graphite lifetime and thus design lifetime of the IMSR of somewhere between 5 and 10 years. These dimensions of the IMSR 90 make transport and replacement of the IMSR 90 manageable and the power density allows many years of usage of any graphite employed. The geometry of the core 102 and vessel 100 can be cylindrical.

The core 102 can be fitted with, or connected to, one or more stress monitors 902 that monitor the stress (shear stress, normal stress, or both) that may develop in the core 102 over time, as the core is subjected to neutrons. The stress monitors are operationally connected to a control system 901 and, upon the stress measured by the stress monitors 902 exceeding a predetermined threshold value, the monitoring system can shut down the IMSR 90. The one or more stress monitors (stress sensors, strain sensors, stress detectors, stress gauges, strain gauges) can include, for example, a ring surrounding the core with a strain gauge connected (mounted) to the ring. Any overall expansion of the graphite will create stress in the ring. The stress in the ring is be detected by the strain gauge mounted on the ring. The one or more stress monitors can also include a stress monitor mounted on any other part that is secured to the core. For example, in instances where the core is mounted to a mounting plate, a stress monitor can be secured to the mounting plate. Stress in the core will transfer to the mounting plate and will be sensed by the stress sensor. The stress monitors can be, for example, electrical in nature in that the resistance of the stress monitor will change as a function of stress. The stress monitors may also be mechanical or optical (e.g., optical fiber stress gauge).

In some embodiments, it is possible to determine the neutron fluence on the core 102. That is, it is possible to determine the number of neutrons per $cm^2$ received by the core 102. It may also be possible to monitor the fluence only for fast neutrons, e.g., for neutrons having an energy above a particular energy level (e.g., 50 KeV). One possible method of determining the neutron fluence would be by inferring the neutron fluence by determining (measuring) local power density which is directly related to both fission power and fast neutron fluence. For example by placing simple thermocouples separated by a short distance within a single salt channel in the core, the temperature difference and flow rate could be used to infer local power density. The IMSR can be shut down automatically or manually when the total neutron fluence meets a threshold criteria. For example, the IMSR can be shut down when the neutron fluence approaches a pre-determined value beyond which the core graphite 102 would likely deform or crack.

Figure 1B:
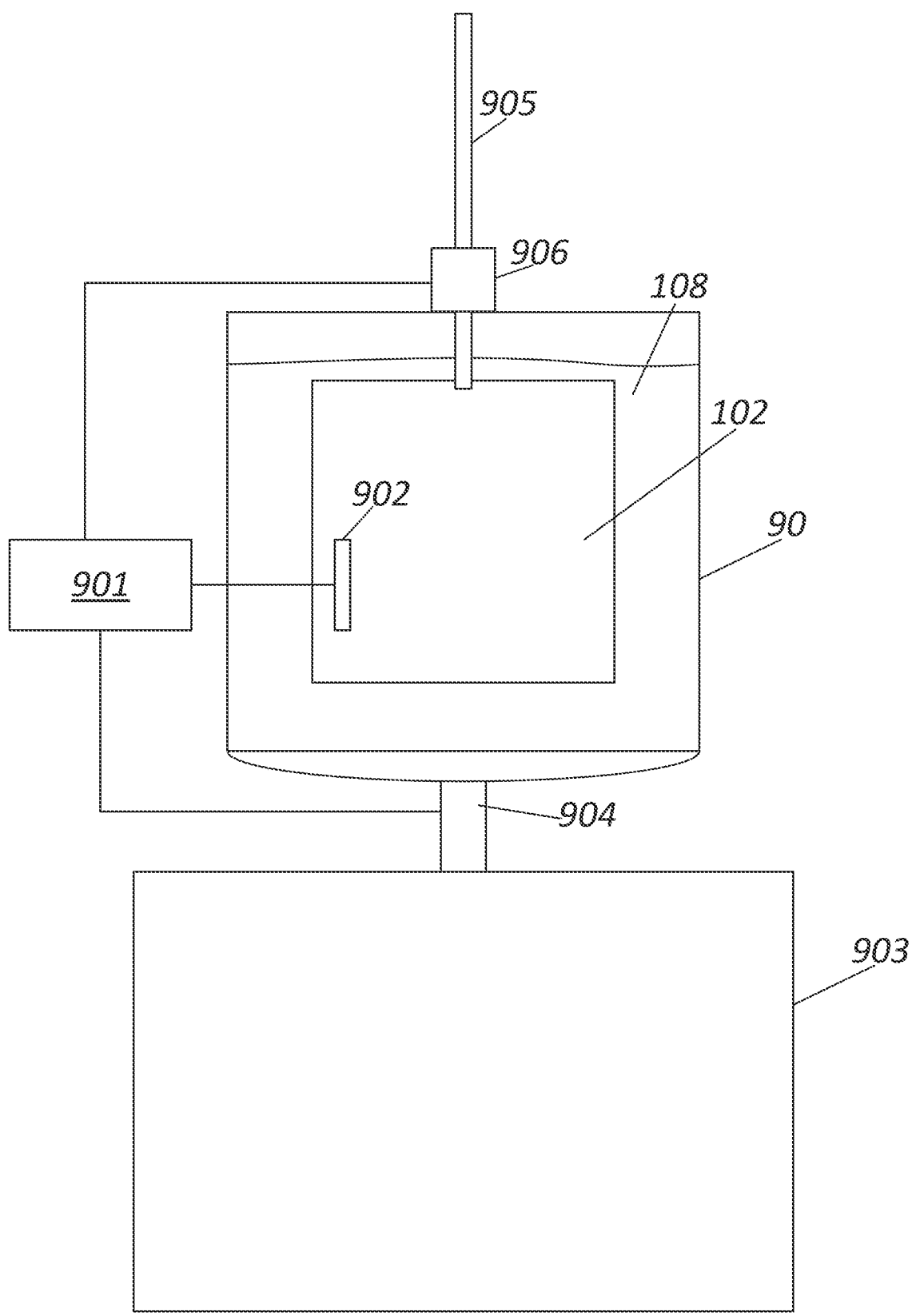
FIG. 1B shows a molten salt nuclear reactor operationally connected to a dump tank.

The IMSR 90 can be shutdown in any suitable manner. For example, and with reference to FIG. 1B, upon occurrence of a shutdown event such as excessive strain in the core 102 or excessive neutron fluence on the core 102, the molten fuel salt 108 can be dumped in a dump tank 903 located below the vessel 90. Such dump tanks can have any suitable geometry, provided the geometry in question does not give rise to criticality. The dump tank 903 can be connected to the vessel through any suitable valve mechanism 904. One such valve mechanism is freeze plug, which comprises a portion of a conduit connecting the vessel 30 to the dump tank. The portion of the conduit is filled with a material that is maintained in the solid state by powered cooling (not shown). The material can be a portion of the fuel salt itself. When the cooling stops, for whatever reason such as controlled shutdown or a loss of external cooling of the reactor, the material melts, opening the valve mechanism 902, and the molten fuel salt 108 falls into the dump tank 903.

Another example of a valve mechanism 904 is that of a mechanical valve held in the open position by springs, and held in the closed position by powered solenoids (not shown). As with power of the powered cooling being remove or lost when power is cut or lost in the solenoids, the solenoids will de-energize and the valve will revert to its open position, under the force of the springs, and the molten fuel salt will fall into the dump tank.

In the freeze plug example and the mechanical valve example, the control system 901 would cut-off power to, respectively, the cooling unit and the solenoids upon occurrence of a shutdown event such as stress in the core 102, or excessive neutron fluence at the core 102, or when external cooling is lost (failure/shutdown of the heat exchanger system).

As another example, upon detection of a shutdown event, the control system 901 can cause a control rod 902 to be lowered in the vessel 90. The control rod 905 can be maintained out of the vessel 90 by a powered device 906 (e.g., a powered solenoid arrangement) as long as there is power provided to the powered device. Upon occurrence of a shutdown event or loss of external cooling of the reactor, the control system 901 shuts off the power to the powered device and the control rod lowers in the vessel 90.

Figure 2:
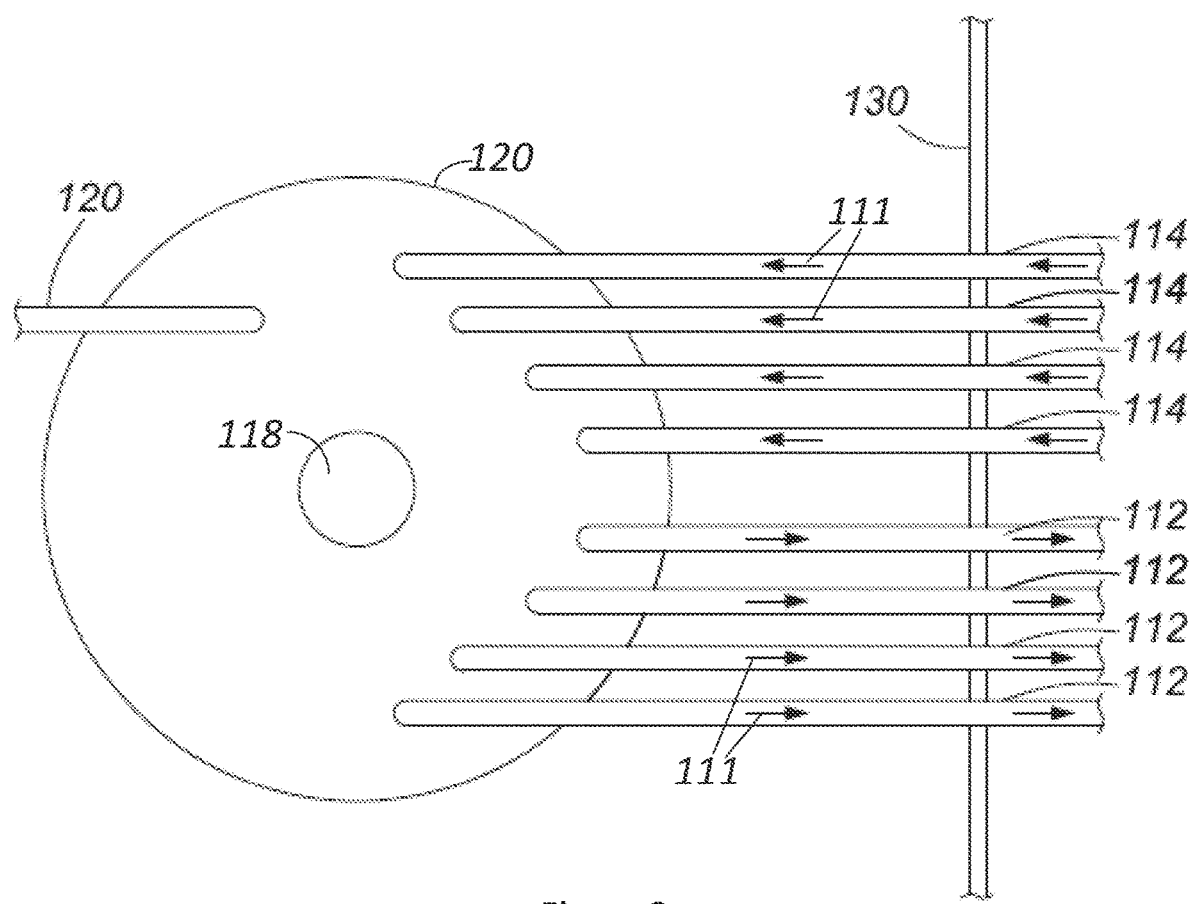
FIG. 2 shows a top view of the embodiment of FIG. 1.

FIG. 2 shows a top down view of the top of an example of an IMSR of the present disclosure. FIG. 2 shows the pump motor 118, and the off gas line 120. As well, FIG. 2 shows a series of four inlet conduits 114 and four outlet conduits 114 passing from the reactor vessel 100 through the primary hot cell wall 130. Four separate pairs of lines (one pair of lines has one inlet conduit 114 and one outlet conduit 112) are depicted; however, any suitable number of such pairs of lines (and associated heat exchanger 119) is also within the scope of the present disclosure. Each pair of lines is connected to a heat exchanger comprised in the heat exchanger unit 106.

An advantage of keeping primary heat exchangers within the IMSR and simply replacing the IMSR after its design lifetime, is that techniques for heat exchanger repair, removal, and/or replacement need not be developed. However plans must be made for potential failure and leakage between the primary fuel salt and secondary coolant. By compartmentalising the primary heat exchanger unit 106 into multiple independent heat exchangers 119, any failure of the heat exchangers 119 and/or leakage of molten fuel salt 108 into the coolant 113 can be effectively managed.

Figure 3:
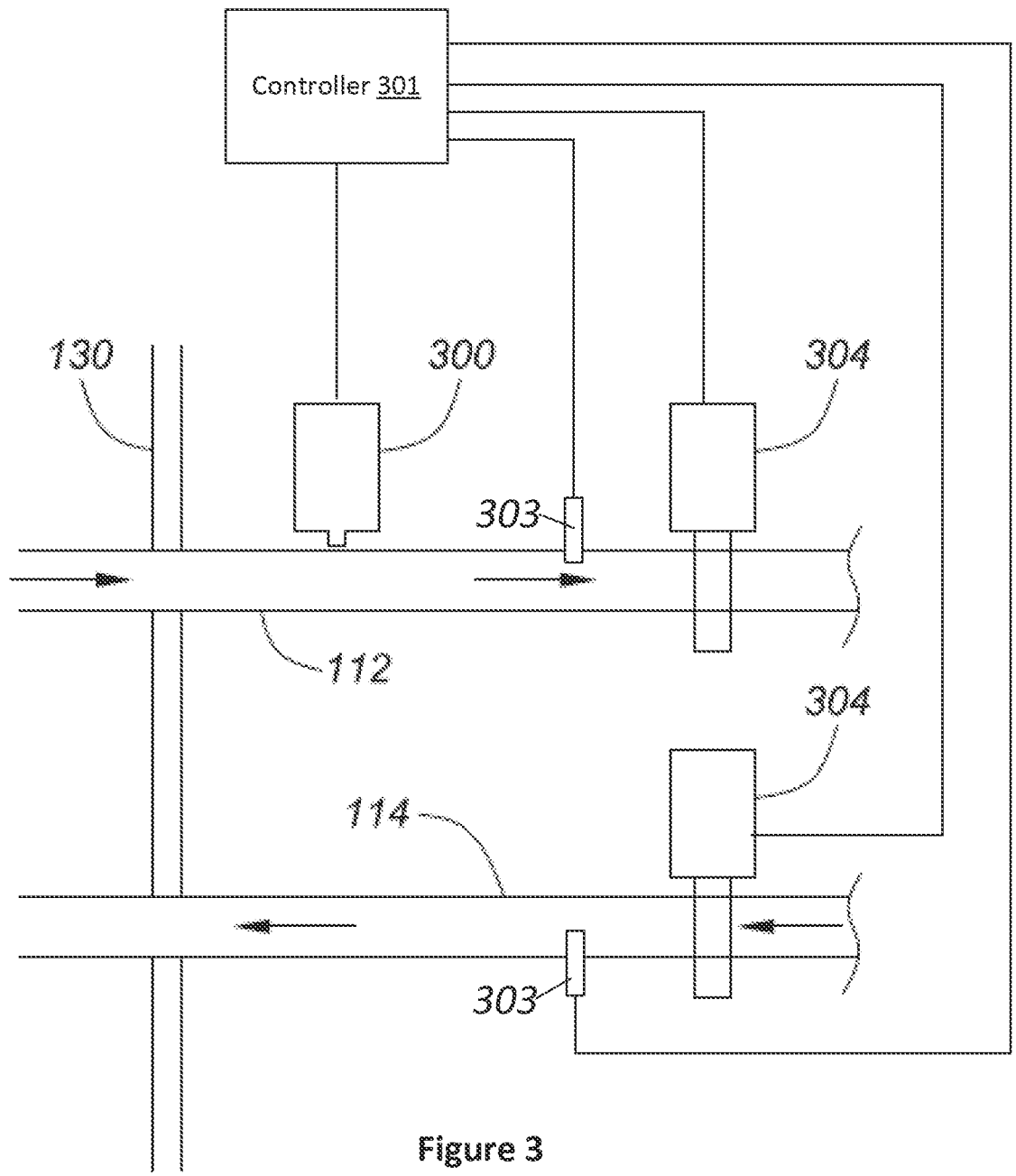
FIG. 3 shows, in accordance with the present disclosure, inlet and outlet molten salt conduits arranged to be shutoff when radioactivity is detected in the molten salt conduits or when a pressure change is detected in the molten salt conduits.

FIG. 3 shows an embodiment of a disconnect arrangement to cut off the flow of the secondary coolant 113 though the inlet conduits 114 and outlet conduits 112 in the direction given by arrows 111. For clarity purposes, only one pair of lines (one inlet conduit 114 and one outlet conduit 112) is shown in FIG. 3. In the example of FIG. 3, a radioactivity detector 300, for example, a Geiger counter is placed next to an outlet line 112 and can detect any leak of radioactive primary fuel salt into the outlet line 112. When radioactivity beyond a pre-determined level is detected by the radioactivity detector 300, a controller 301, connected to the radiation detector 301, controls shutoff mechanisms 304 that are connected to the outlet conduit 112 and the inlet conduit 114, to shut the outlet conduit 112 and its corresponding inlet conduit 114. The shutoff mechanisms are to isolate the individual heat exchanger 119 (not shown in FIG. 2) connected to the now shut inlet conduit 114 and outlet conduit 112. The shutoff mechanisms 304 can also be to sever the physical connection along the inlet conduit 114 and the outlet conduit 112. The shutoff mechanisms can include any suitable type of shutoff valves and any suitable type of crimping devices, the latter to crimp shut the inlet conduit 114 and the inlet conduit 112. The shutoff mechanisms 304 can also include a refrigerating unit that can cool and freeze the coolant salt circulating in a compromised inlet conduit or a compromised outlet conduit. Such freezing would occur in a segment of the compromised conduit (inlet or outlet) and stop the flow of coolant salt. In some embodiments, where the inlet and/or outlet conduits are substantial in diameter and hence difficult to freeze, the conduits can be mechanically stretched to reduce their diameter and the sections of the conduits having the reduced diameter can be frozen.

Further, if a leak of secondary coolant fluid 113 into the molten fuel salt 108 occurs, it can be detected by measuring a drop in pressure, using one or more pressure detectors 303 mounted in or otherwise operationally connected to the inlet conduit 114, the outlet conduit 112 or both. The one or more pressure detectors are operationally connected to the controller 301, which can shut off the shutoff mechanisms 304 upon determining that a drop in pressure (or any abnormal change in pressure) has occurred in the coolant salt 113 circulating in the inlet conduit 114, outlet conduit 112, or both. Furthermore, when a leak of secondary coolant fluid 113 into the molten fuel salt 108 occurs, it can be detected by monitoring (e.g., periodically monitoring) the level of molten salt in the reactor vessel. If the level of molten salt rises, then it can be attributed to a leak of secondary coolant salt.

In some embodiments, each pair or group of pairs of inlet conduit and outlet conduit can be connected to a distinct coolant pump. When a fault is detected in one of the pairs, the pump to which the pair is associated can be shut down and the conduit in question can be crimped, frozen or otherwise disabled by a shutoff mechanism. Provided that all the coolant pumps are not shutdown, the nuclear reactor can still function.

By choosing compatible primary carrier salts for the molten fuel salt 108 and the secondary coolant salt 113, mixing of these fluids can be tolerated. For example, if the primary carrier salt is LiF—BeF2 and/or NaF—BeF2, then a secondary coolant salt of LiF—BeF2 and/or NaF—BeF2 would be compatible with the primary carrier salt in cases of limited mixing, i.e. in cases where the volume of coolant salt 113 leaked in into the molten fuel salt 108 is tolerable in terms of its effects on neutron production and absorption. By having many, perhaps 4 but even up to 10 or more pairs of inlet conduits/outlet conduits (and corresponding heat exchangers 119), the loss of one or more individual heat exchangers may do little to the overall ability to transfer heat from the primary heat exchanger unit 106 to the coolant salt 113 as the other remaining pairs of inlet conduits/outlet conduits can simply take the added heat exchange load or the IMSR can lower its power rating slightly. Heat exchangers are unlike many other systems in that there is very little economy of scale such that 10 smaller pairs of inlet/outlets or tube bundles will not have a combined cost much more than one large unit.

Figure 4:
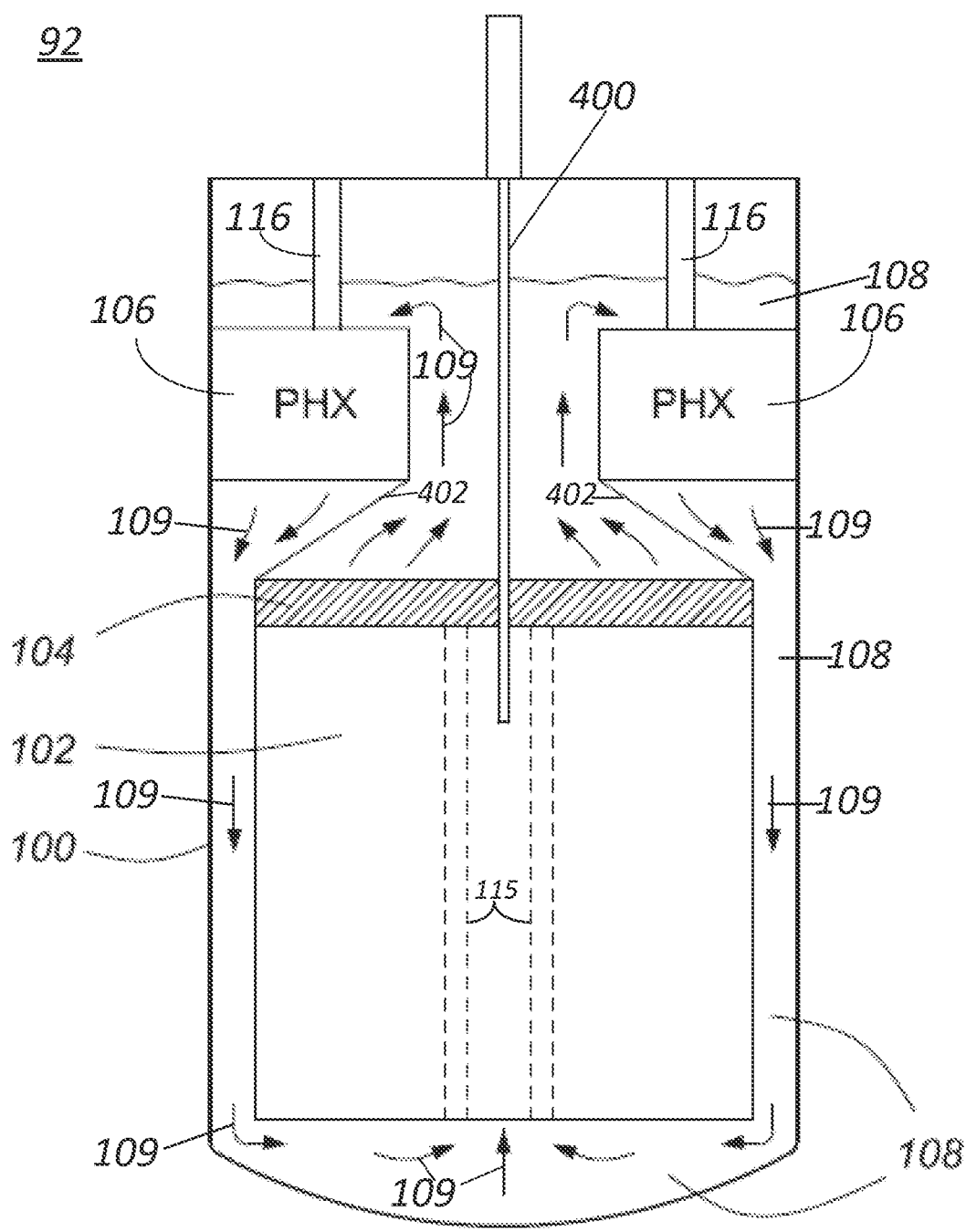
FIG. 4 shows another embodiment of a molten salt nuclear reactor in accordance with the present disclosure.

FIG. 4 shows another embodiment of an IMSR 92 in accordance with the present disclosure. As in the IMSR 90 of FIG. 1A, the IMSR 92 of FIG. 4 comprises a vessel 100, a reflector 104 and a core 102. Additionally, the IMSR 92 comprises a control rod 400 (which can be optional) and a series of heat exchanger units 106. Each heat exchanger unit has a drive shaft and impeller unit 116 to pump molten fuel salt 108 through the heat exchanger units 106. For clarity purposes, pump motors that drive the shaft and impeller units 116 are not shown. Also for clarity purposes, inlet conduits and outlets conduits propagating a coolant salt through the heat exchanger units 106 are not shown.

The molten salt fuel 108 that is pumped through the heat exchanger units 106 is directed downwards, towards the periphery of the core 102 by a baffle structure 402. The molten fuel salt flows towards the bottom of the vessel 100 and then upwards through the channels 115 of the core 102. Although two channels 115 are shown in FIG. 4, any suitable number of channels 115 is within the scope of the present disclosure.

Figure 5:
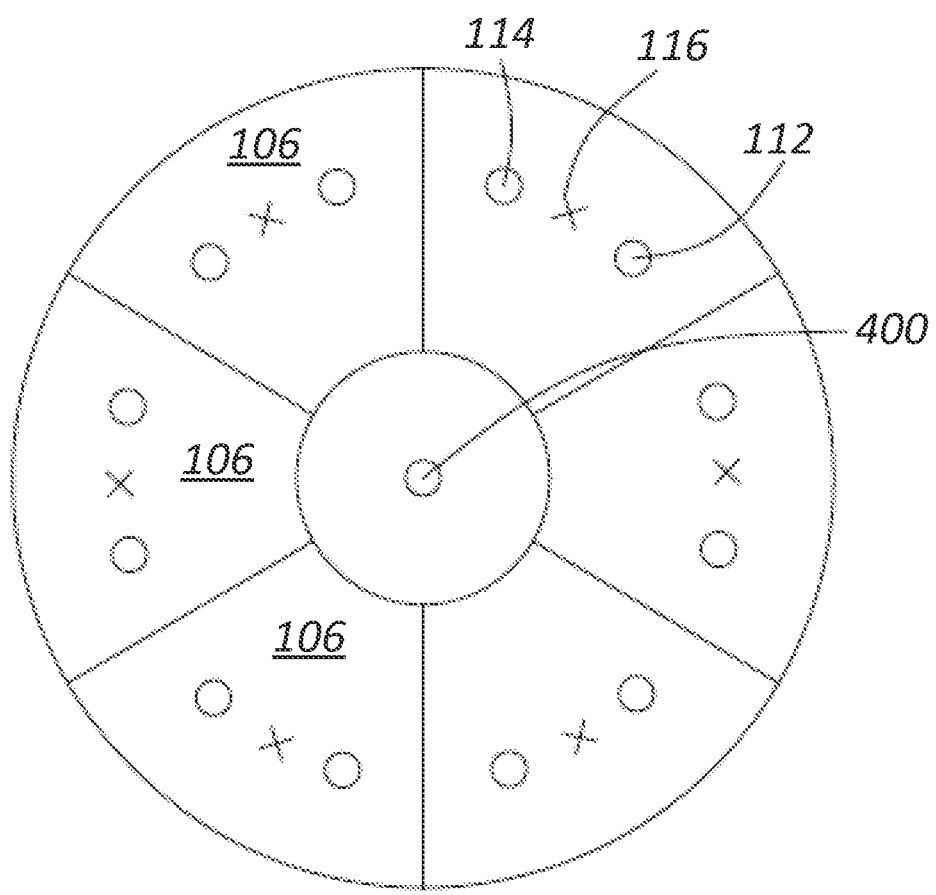
FIG. 5 shows a top view of the embodiment of FIG. 4.

FIG. 5 shows a top, cross-sectional view of the MSR 92 shown at FIG. 4. The top view of FIG. 5 shows 8 heat exchanger units 106, each having an inlet conduit 114, an outlet conduit 112, and a pump shaft and impeller unit 116. Also shown is the control rod 400.

Figure 6:
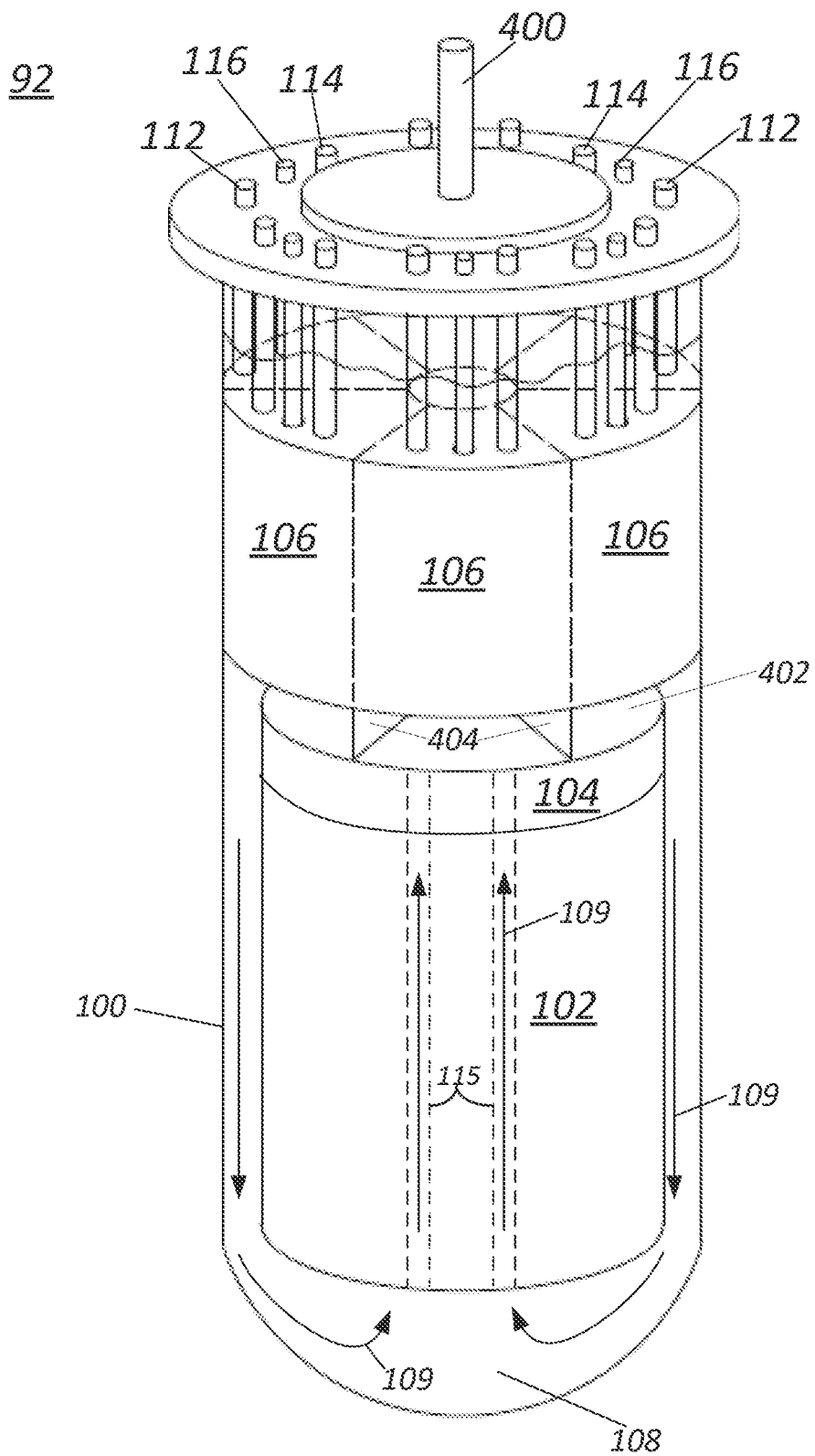
FIG. 6 shows yet another embodiment of a molten salt nuclear reactor in accordance with the present disclosure.

FIG. 6 shows a side perspective view of the IMSR of FIG. 4. The IMSR 92 comprises six heat exchanger units 106, each having an inlet conduit 114, outlet conduit 112, and shaft and impeller unit 116. The heat exchanger units 106 are positioned above the core 102 and about a longitudinal axis of the vessel, the longitudinal axis being parallel to the control rod 400. The direction of flow of the molten fuel salt 108 is indicated by arrow 109. After exiting the individual heat exchangers 106, the molten fuel 108 flows obliquely down, guided by the baffle structure 402 and, optionally, by partitions 404 that separate the outputs of the individual heat exchanger units.

The flow of the molten fuel salt 108 through the core 102 may be in different directions in different embodiments, for example upwards as shown in the embodiment of FIG. 4 or downwards as shown in the embodiment of FIG. 1A. There are advantages and disadvantages to both upwards and downwards flow directions. An upward flow through the core as shown in FIG. 4 has the advantage of being in the same direction as natural circulation but can make the use of pumps (the pumps pumping the coolant salt through the heat exchanger units) slightly more difficult to direct the flow through the primary heat exchangers.

Figure 7:
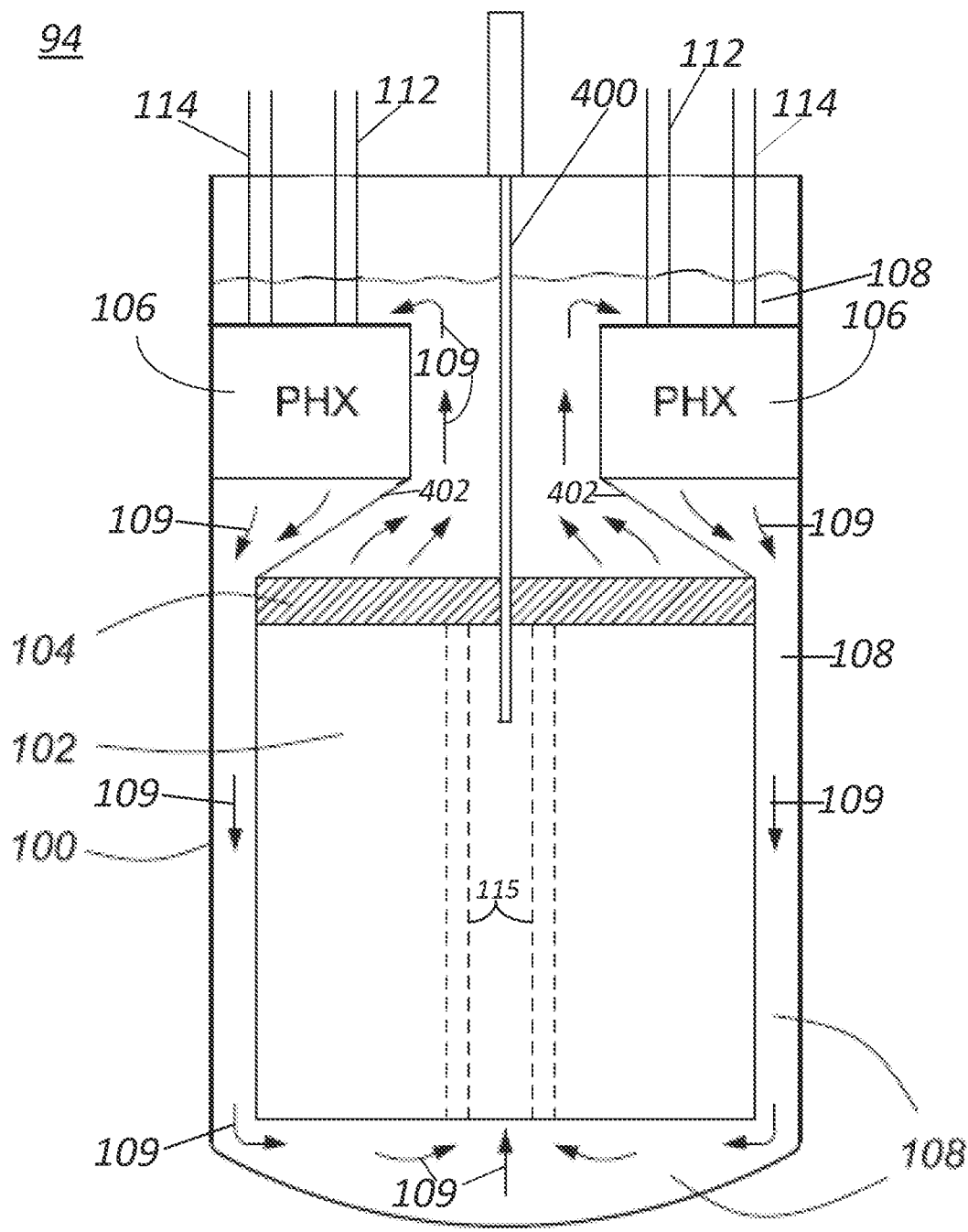
FIG. 7 shows a further embodiment of a molten salt nuclear reactor in accordance with the present disclosure.

In some embodiments of the present disclosure, the pumps and the shaft and impeller units can be omitted and the MSR can instead use natural circulation to circulate the molten fuel salt 108. As such, the pumps and the shaft and impeller units can be optional in embodiments where natural circulation suffices to circulate the molten salt fuel 108. FIG. 7 shows an embodiment where natural circulation of the molten fuel salt 108 is used. The MSR 94 of FIG. 7 is similar to the MSR 92 of FIG. 6 with the exception that no pumps or shaft an impeller units are required. Rather, the molten fuel salt 108 present in the channels 115 heats up through nuclear fission reaction and flows upwards towards the top region of the vessel 100. Once outside the channels 115, the molten salt cools down and begins to flow downwards, through the heat exchangers 105, and towards the bottom of the vessel 100 where the cooled molten fuel salt re-enters the channels to be heated up.

Figure 8:
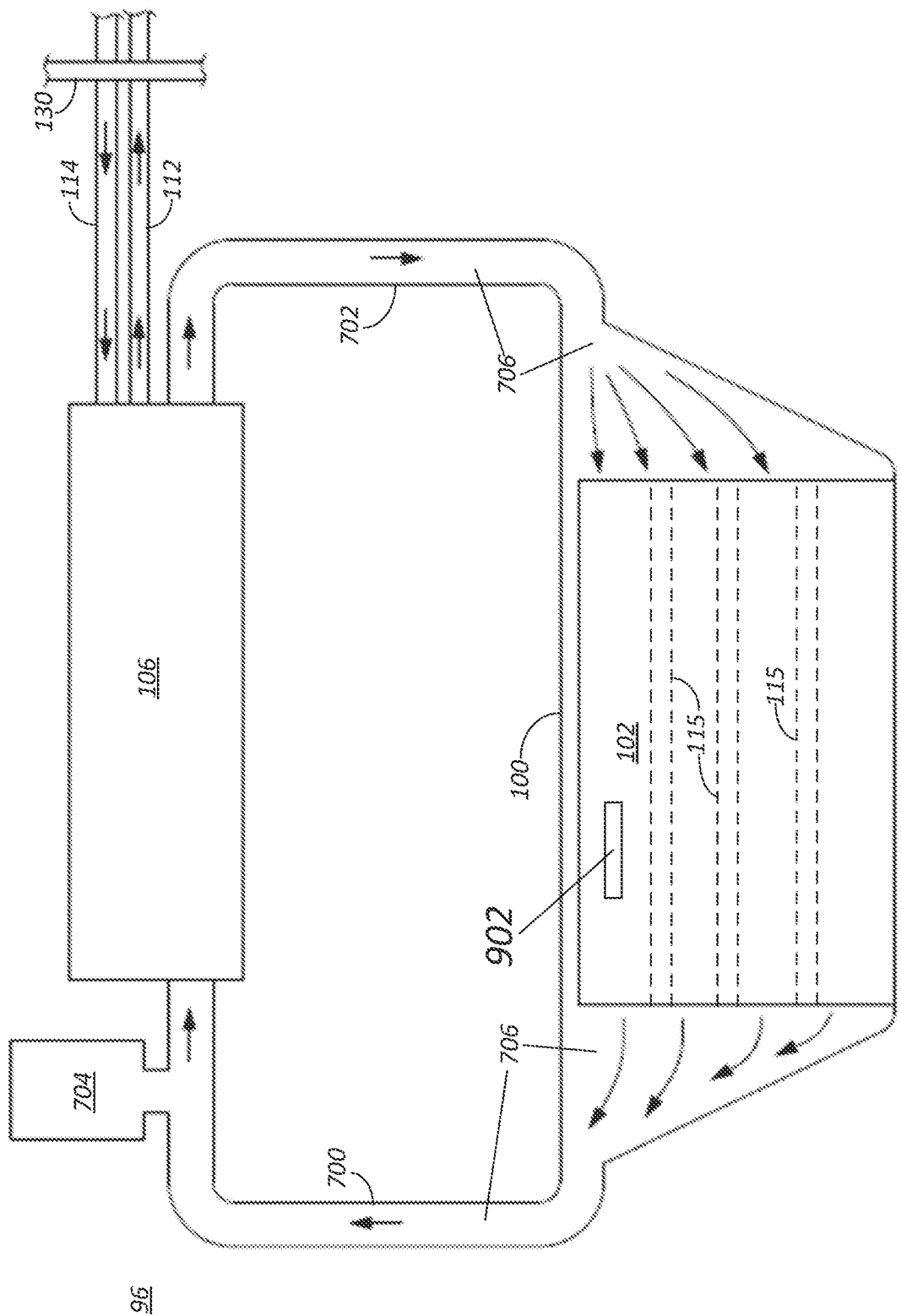
FIG. 8 shows an additional embodiment of a molten salt nuclear reactor in accordance with the present disclosure.

FIG. 8 shows another embodiment of an IMSR in accordance with the present disclosure. The IMSR 96 of FIG. 8 has a vessel 100 in which is positioned a graphite moderator core 102, which can have one or more channels 115 defined therein. The vessel 100 is connected to a heat exchanger unit 106 that is located outside the vessel 100. The heat exchanger unit 106 contains a plurality of heat exchangers (not shown); each heat exchanger includes an inlet conduit 114 and an outlet conduit 112 that circulate coolant salt though the heat exchanger. Each inlet conduit 114 and outlet conduit 112 is operationally connected to a coolant salt pump system (not shown). The inlet conduit 114 and the outlet conduit 112 are shown traversing a hot cell wall 130. The vessel 100 is connected to the heat exchanger unit 106 through conduits 700 and 702. A pump 704 circulates a molten fuel salt 706 through the vessel 100, the channels 115, and the heat exchanger 106. The same configuration of radioactivity detector, pressure detectors 303, shut-off mechanisms, and controller shown at FIG. 3, can also be applied to the embodiment of FIG. 8. The core 102 can be fitted with one or more stress monitors 902 that monitor the stress (shear stress, normal stress, or both) that may develop in the core 102 over time, as the core is subjected to neutrons. The stress monitors are operationally connected a monitoring system (not shown and, upon the stress measured by the stress monitors 902 exceeding a predetermined threshold value, the monitoring system can shut down the IMSR 96.

Upon the graphite moderator core 102 reaching its operational lifetime, the conduits 700 and 702 can be severed to physically disconnect the vessel 100 from the remainder of the IMSR. After sealing the cut-off portion of the conduits 700 and 702 attached to the vessel 100, the vessel 100 can be disposed in a containment facility and a new vessel with a new graphite moderator core can be attached to the conduits 700 and 702.

The IMSR embodiments shown at FIGS. 1-8 were described has having a molten fuel salt (108 or 706) circulating therein. However, modifications to the embodiments of FIGS. 1-8 would allow the IMSRs shown therein to operate on a solid nuclear fuel comprised within the core 102 as opposed to being comprised in the molten fuel salt. For example, in the embodiment of FIG. 1A, the molten fuel salt can be replaced by a fuel-free (nuclear fuel-free) molten salt and the core 102 can comprise solid nuclear fuel such as TRISO fuels. Further, as no fission gasses are released in such solid fuel IMSRs, there would be no need for the off gas line 120. As previously described however, there are similar advantages to the invention of integrating a sealed solid fuel core into the replaceable IMSR unit.

Figure 9:
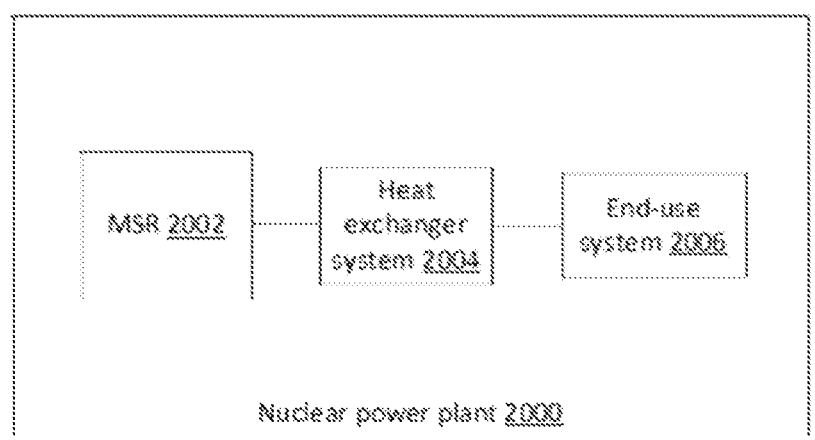
FIG. 9 shows a flowchart of a method according to certain examples of the present disclosure.

FIG. 9 shows a block diagram of an embodiment of a nuclear power plant 2000 that includes an MSR 2002 such as, any one of IMSR 90, 92, 94, and 96 described above in relation to FIGS. 1, 4, 6, 7, and 8. The MSR 2002 generates heat and provides the generated heat to a heat exchanger system 2004. The heat exchanger system 2004 can include the heat exchanger unit 106 disposed in the vessel 100, which also includes a graphite moderator core 102 and is discussed above in relation FIGS. 1, 4, 6, and 7. With respect to MSR 96 shown at FIG. 8, the heat exchanger system 2004 can include the heat exchanger unit 106, which is located outside the vessel 100 that includes the graphite moderator core 102. Additionally, the heat exchanger system 2004 of FIG. 9 can include additional heat exchangers that receive the heat from the above noted heat exchanger units 106. The nuclear power plant 2000 of FIG. 9 includes an end-use system 2006 that receives heat from the heat exchanger system 2004 and uses that heat to do work. For example, the end-use system 2006 can include a heat exchanger apparatus that transport the heat received from the heat exchanger system 2004 to an industrial apparatus that uses that heat. An example of such an industrial apparatus includes a cement kiln. In other embodiments, the end-use system 2006 can include a steam generator that uses the heat received from the heat exchanger system 2004 to produce steam that powers a turbine system, which can be used to power an electrical generator. In further embodiments, the end-use system 2006 can include a steam generator that uses the heat received from the heat exchanger system 2004 to produce steam that is used for bitumen extraction from bituminous sands (e.g., steam assisted gravity drainage).

Figure 10:
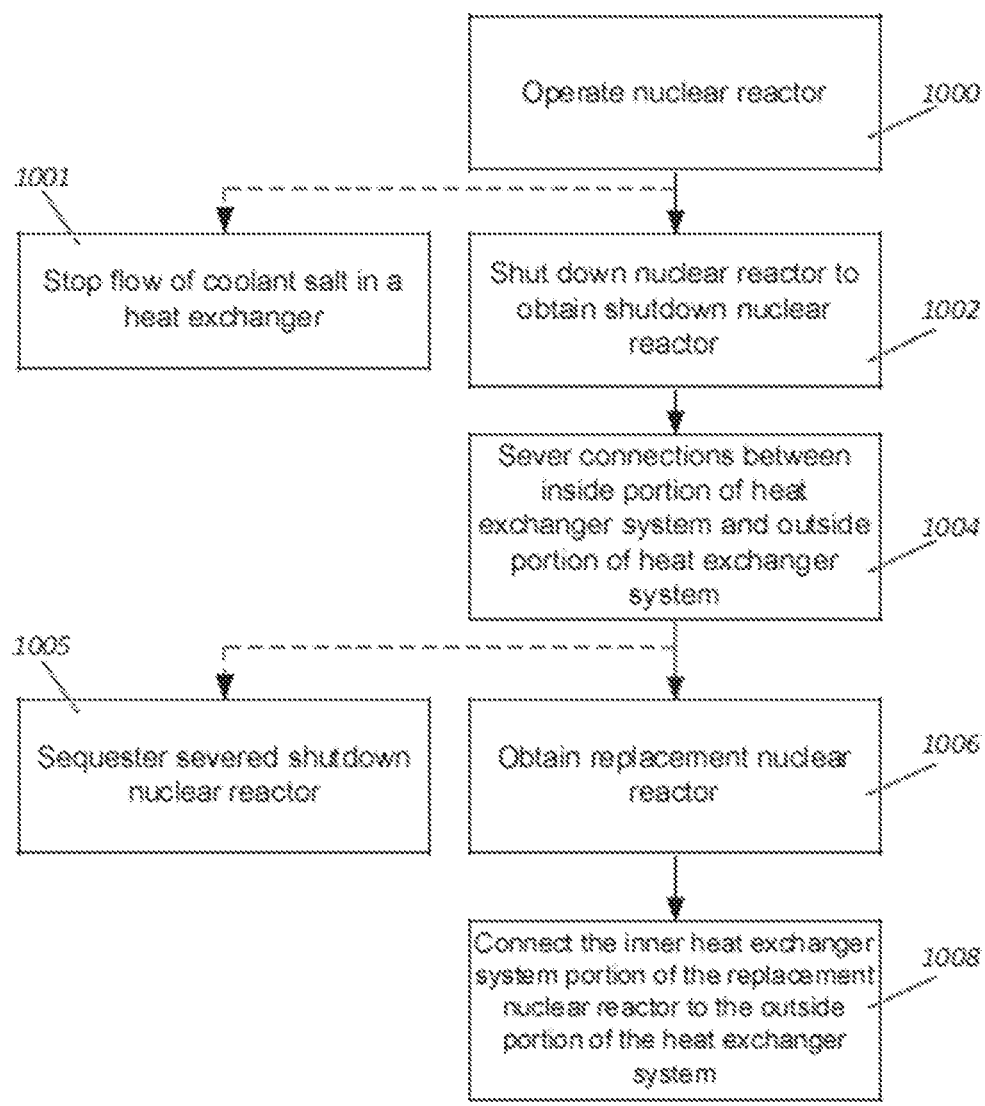
FIG. 10 shows a nuclear power plant according to certain examples of the present disclosure.

FIG. 10 shows a flowchart of a method according to certain examples of the present disclosure. The method shown at FIG. 10 is a method of operating a nuclear power plant. The nuclear power plant comprises a nuclear reactor (e.g., an MSR) that generates heat (thermal energy) and a heat exchanger system. The nuclear reactor comprises a vessel, a graphite moderator core positioned in the vessel, and a molten salt circulating at least in the vessel. In embodiments where the nuclear reactor is an MSR, the molten salt is a molten fuel salt. The nuclear reactor heats the molten salt and the heat exchanger system receives the heat from the molten salt.

The method of FIG. 10 includes, at action 1000, operating the nuclear reactor. At action 1002, the MSR is shut down upon occurrence of a shutdown event. Shutdown events can include, for example, a detection of strain in the graphite moderator core the neutron fluence on the graphite moderator exceeding a maximum fluence level, and an operation duration of the nuclear reactor exceeding a pre-determined operation duration. The pre-determined duration of operation is determined in relation to maintaining the structural integrity of the graphite moderator core positioned in the vessel of the MSR and in relation to the operation conditions under which the MSR operates. For a given graphite moderator core, when the pre-determined operation conditions are such that the graphite moderator core is subjected to low peak power densities and low average power densities, the pre-determined duration of operation will be longer than when the pre-determined operation conditions are such that the graphite moderator core is subjected to high peak power densities and high average power densities. An MSR having a peak power density of 20 $MW_{thermal}/m^3$ would result in the pre-determined duration of operation being about 11.5 years when running at full capacity, and about 15 years when running at 75% capacity. It is envisaged that the operational time (duration) of a practical IMSR will be less than 15 years and thus, will have a peak power density higher than 20 $MW_{thermal}/m^3$.

At action 1004, all operational connections between the inside portion of the heat exchanger system and the outside portion of the heat exchanger system are severed. This results in a severed, shut-down nuclear reactor. That is, any type of conduit connected to the nuclear and used to transfer heat from the nuclear reactor to any part of the heat exchanger system located outside the vessel is severed. Further, electrical connections for pump motors and monitoring instrumentation, small conduits for makeup fuel salt addition, salt sampling, off gas removal and a dip line for the removal of the fuel salt can also be severed when, for example, the severed shutdown nuclear reactor is to be moved or sequestered At action 1006, a replacement nuclear reactor can be obtained and, at action 1008, the inner heat exchanger system portion of the replacement nuclear reactor is connected to the outside portion of the heat exchanger system. If applicable, any other electrical connections for pump motors and monitoring instrumentation, small conduits for makeup fuel salt addition, salt sampling, off gas removal and a dip line for the removal of the fuel salt of the replacement nuclear reactor can be made.

At action 1001, if fault in a heat exchanger is detected, the flow of coolant salt in the faulty heat exchanger can be stopped. At action 1005, the severed, shutdown nuclear reactor can be sequestered.

To shut down the nuclear reactor, a control rod (shutdown rod) can be used or, in embodiments where the nuclear reactor is an MSR, by draining the molten fuel salt to an external storage such as a dump tank. The coolant lines can then be sealed and/or crimped and disconnected along with any other lines such as off gas lines. Examples of coolant lines are shown in FIG. 1 as inlet conduit 114 and outlet conduit 112. After disconnecting these lines the spent nuclear reactor, i.e., the reactor vessel and all remaining conduit segments attached thereto, can be removed, for example, by using an overhead crane. Such operations might be done after a period of in situ cool down for radiation levels to diminish. In such a mode, likely the next unit (i.e., the replacement nuclear reactor) can be installed adjacent the spent IMSR such that, long term, while one unit operates, the other is cooling down and then replaced before the operating unit is finished its cycle. Using an overhead crane for removal may involve some mechanism to breach the primary hot cell.

The pump motor (see reference numeral in FIG. 1), when present, can be recycled, for example by, cutting it from the shaft of the impeller to which the pump motor is connected. The rest of the spent nuclear reactor can be transferred off site or to another area of the nuclear power plant, perhaps even within the primary hot cell. As an option, the unit might also be used for the short, medium or even long term storage of the primary fuel salt itself, perhaps after some or all actinides are removed for recycle or alternate storage. Thus the spent nuclear reactor may act as a storage and/or disposal canister for the internal graphite, primary heat exchangers and even the salt itself. At some point a decision on long term sequestration would have to be made but potentially the entire unit could be lowered into an underground location such as deep borehole made on site or transported to a salt cavern for safe long term sequestration.

Some comment on the overall economic viability is perhaps of use as it goes against the often imposed logic of attempting to get the longest service life as possible from all components. The advantages seem to greatly outweigh any economic penalty of decreased capital amortization time. First, there may be little change in the overall need of graphite over the lifetime of the nuclear plant itself as would be understood by those trained in the field. Second, the components now having a shorter design life such as the reactor vessel and/or primary heat exchangers typically make up only a small fraction of the nuclear plant costs. In studies by Oak Ridge National Laboratories, such as in ORNL 4145 the cost of the reactor vessel and primary heat exchangers were only around 10% of the plant cost. The ability to lower the cost of these items by the great simplifications allowed by having a sealed replaceable unit would seem to more than make up for the lowered amortization time. When the decreased research and development costs are factored in, the advantage of this disclosed design seem clear.

Figure 11:
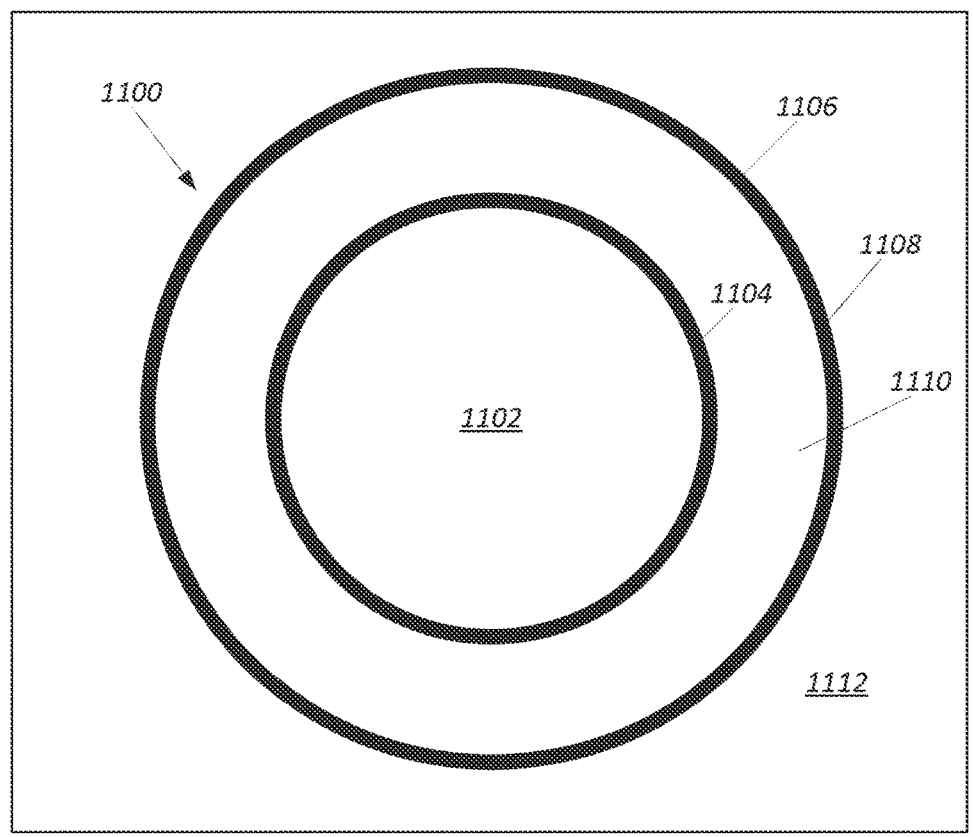
FIG. 11 shows another embodiment of a nuclear reactor in accordance with the present disclosure.

FIG. 11 shows a top, cross-sectional view of a further embodiment of a nuclear reactor 1100 of the present disclosure. The nuclear reactor 1100 has a nuclear reactor vessel, which has a nuclear reactor vessel wall 1104 and, the nuclear reactor vessel 1102 is contained in a containment vessel 1106, which has a containment vessel wall 1108. Between the nuclear reactor vessel wall 1104 and the containment vessel wall 1108 is a buffer salt 1110. The nuclear reactor wall 1104 is made of a thermally conductive material, for example, a nickel-base alloy such as Hastelloy® N. The buffer salt 1110 is in thermal contact with the nuclear reactor wall 1104.

Upon loss of electrical power to the heat exchanger system, the pumps pumping the coolant salt through the heat exchangers located inside the vessel will stop functioning. However, some of decay heat will continue to be transferred out the reactor vessel through natural circulation: that is, the coolant salt in the reactor vessel will heat up and circulate through the secondary heat exchangers (secondary heat exchanger loops) system by convection. As such, provided the heat exchanger system remains able to shed some of the heat received by nuclear reactor, severe consequences, such as damaging the metallic structure of the nuclear reactor vessel, can be avoided.

However, upon a catastrophic event, for example an earthquake, where the heat exchanger system becomes thoroughly defective, i.e., is no longer able to transfer any significant heat from the nuclear reactor 1102, the nuclear reactor 1102 can no longer transfer the decay heat generated therein and failure to properly manage the decay heat can lead to severe consequences.

In accordance with the present disclosure, the decay heat can be safely managed by selecting a buffer salt 1110 that acts as a phase transition heat sink. When used in MSRs, the buffer salt provides an alternative to the freeze plug and dump tank approach often used in MSRs. The virtue of the embodiment of FIG. 11 is the ability to passively dissipate the decay heat that is produced by nuclear reactors after the loss of external cooling (i.e., when the heat exchanger system can no longer transfer any significant heat from the nuclear reactor). The embodiment of FIG. 11 enables the dissipation of the decay-heat surge even when there is loss of external cooling, thereby avoiding severe consequences.

As an example, the nuclear reactor 1100 can be considered to be an MSR that runs at about 650° C. and produces thermal energy at a rate of 80 $MW_{th}$ (full power value) and the nuclear reactor vessel wall 1104 is at 650° C. Upon shutdown, the decay heat generated by the nuclear reactor will be, averaged over the first two days, about 0.5% of the full power value and the temperature of the nuclear reactor vessel wall 1104 will increase.

When the buffer salt 1110 is 53% NaF-47% $AlF_3$ (density of 2.4 t/m$^3$ with 400 kJ/kg latent heat, melting point of 695° C.) and is 1 meter thick, the total mass of the buffer salt is about 177 tons and provides a latent heat of melting of $7.1 \times 10^{10}$ joules. In this example, the buffer salt 1110 provides approximately 2 days of initial decay heat absorption even with an adiabatic assumption of no other heat loss. That is, it will take about two days for the buffer salt 1110 to melt, i.e., about two days for the temperature of the nuclear reactor vessel wall 1104 and of the buffer salt 1110 to reach the buffer salt's melting point of 695° C.

After the buffer salt has melted it remains in the containment vessel 1106, surrounding the nuclear reactor 1102, the decay heat is no longer absorbed by the buffer salt and needs to me managed otherwise. Several options of managing the decay heat are available. For example, the containment vessel can be surrounded by water (a water jacket) 1112 that will be boiled off by the decay heat. In the present example the water 1112 will boil off at a rate of about 8 liters/minute (this boil-off rate will decrease with time as less and less decay heat is generated). The boiled off water can be replenished by a water reservoir (not shown). A modest reservoir can supply water for many months, especially in view of the unrealistic adiabatic assumption; clearly, radiant and conductive heat will be dissipated into the building housing the nuclear and in the environment surrounding the water jacket. As such, the realistic water boil-off rate will be less that 8 liters/minute. The water jacket can be in the form of coiled piping surrounding the containment vessel and in thermal contact with the containment vessel wall 1108. The coiled piping is connected to the water reservoir. In other embodiments, an air jacket can be used. The air jacket can be in the form of coiled piping surrounding the containment vessel and in thermal contact with the containment vessel wall 1108. As will be understood by the skilled worker, in some embodiments, providing cooling to the containment vessel may cause a relatively thin layer of the buffer salt adjoining the outside wall of the containment vessel to remain in the solid state when the temperature at the wall in question is at, or below, the freezing point of the buffer salt. Such embodiments are within the scope of the present disclosure.

The buffer salt 1110 can be selected to be a thermal insulator when in the solid state and a thermal conductor when in the liquid (molten buffer salt) state. Specifically, the solid state thermal conductivity of the selected buffer salt is lower than the heat transfer capability of the liquid sate buffer salt. That is, convective heat transfer in the liquid state is significantly higher than conductive heat transfer in the solid state. 53% NaF-47% AlF$_3$ is such a buffer salt. Having the buffer salt 1110 acting as a thermal insulator during operation of the nuclear reactor reduced loss of heat generated by the nuclear reactions taking place in the nuclear reactor vessel 1102.

Figure 12:
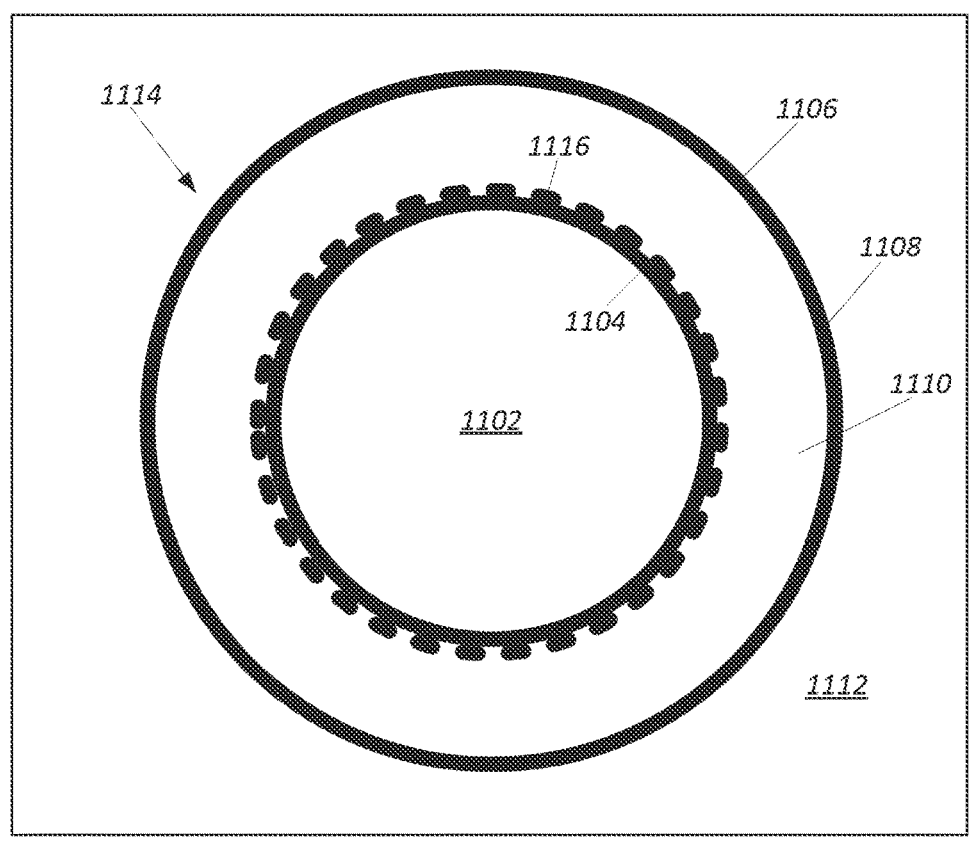
FIG. 12 shows yet another embodiment of a nuclear reactor in accordance with the present disclosure.

FIG. 12 shows a top, cross-sectional view of a further embodiment of a nuclear reactor 1114 of the present disclosure. As in the nuclear reactor 1100 of FIG. 11, the nuclear reactor 1114 has a nuclear reactor vessel 1102, which has a nuclear reactor vessel wall 1104 and, the nuclear reactor vessel 1102 is contained in a containment vessel 1106, which has a containment vessel wall 1108, which can be referred to as an outer wall or as a containment vessel outer wall. Additionally, the containment vessel has an inner wall 116 (shown with dashed line) that is in thermal contact with the nuclear reactor vessel wall 1104. Between the inner wall 1116 and the containment vessel wall 1108 is the buffer salt 1110. The inner wall 1116 is thermally conductive and, as such, the buffer salt 1110 is in thermal contact with the nuclear reactor wall 1104. Advantageously, the nuclear reactor 1114 allows for removal of the nuclear reactor vessel 1102 from the containment vessel 1106 without having to remove the buffer salt 1110. Also, a replacement nuclear reactor can be inserted in the containment vessel 1106.

Even though the above examples use 53% NaF-47% AlF$_3$ as a buffer salt, any other suitable buffer salt can be used. That is, salts that have a melting point above the operating temperature of the nuclear reactor and that can act as a thermal insulator in the solid state and as a thermal conductor (by convection) in the liquid state can be used. Other examples of salts that can be used as buffer salts include: other fluoride salts such as 66% NaF-34% ZrF4 (melting point of 640° C.) and 26% KF-74% Zr4 (melting point of 700° C.); bromide salts such as NaBr (melting point of 747° C., latent heat of melting: 250 KJ/Kg) and KBr (melting point of 734° C.; and other salts such as MgCl (melting point of 714° C., latent heat of melting; 360 kJ/Kg).

Even though the nuclear reactors of FIGS. 11 and 12 are shown with buffer salts, other embodiments may use a buffer material other than a buffer salt. For example, the buffer salt 1110 of FIGS. 11 and 12 can be replaced by pure aluminum (melting point of 660° C., latent heat of melting: 397 kJ/Kg). In this case, to avoid having excessive heat transfer between the nuclear vessel and the containment vessel during normal operation of the nuclear reactor, the aluminum can be in the form of balls, which allows for only some thermal contact between neighbouring balls and the nuclear reactor vessel wall and the containment vessel.

As with other nuclear reactors described herein, the nuclear reactors shown at FIGS. 11 and 12 can also be disconnected, removed, and replaced as a unit, with or without the containment vessel.

In the preceding description, for purposes of explanation, numerous details are set forth in order to provide a thorough understanding of the embodiments. However it will be apparent to one skilled in the art that these specific details are not required.

The above described embodiments are intended to be examples only. Alterations, modifications and variations can be effected to the particular embodiments by those skilled in the art without departing from the scope, to be defined solely in the accompanying claims.

The invention claimed is:

1. A nuclear power plant comprising:
a molten salt reactor (MSR) to produce heat, the MSR comprising a vessel;
a heat exchanger system;
radioactivity detectors positioned outside the vessel;
shutoff mechanisms positioned outside the vessel; and
an end-use system,
the MSR comprising a graphite moderator core positioned in the vessel, and a molten salt circulating at least in the vessel, the molten salt to transfer the heat produced by the MSR to the heat exchanger system, the graphite moderator core defining one or more than one through hole,
the heat exchanger system to receive the heat produced by the MSR and to provide the received heat to the end use system,
the heat exchanger system comprising a plurality of heat exchangers in fluid communication with the one or more than one through hole of the graphite moderator core,
each heat exchanger having associated thereto a respective radioactivity detector, each radioactivity detector arranged to detect radioactivity present in a coolant salt circulating in the respective heat exchanger,
each shutoff mechanism arranged to shut off circulation of the coolant salt circulating in the respective heat exchanger when radioactivity beyond a threshold amount is detected, by the respective radioactivity detector, in the respective heat exchanger.

2. A nuclear power plant comprising:
a molten salt reactor (MSR) to produce heat, the MSR comprising a vessel;
a heat exchanger system;
radioactivity detectors positioned outside the vessel;
shutoff mechanisms positioned outside the vessel; and
an end-use system,
the MSR comprising a graphite moderator core positioned in the vessel, and a molten salt circulating at least in the vessel, the molten salt to transfer the heat produced by the MSR to the heat exchanger system, the graphite moderator core defining one or more than one through hole, the vessel being sealed to permanently integrate the graphite core into the vessel,
the heat exchanger system having an inside portion located inside the vessel and an outside portion located outside the vessel, the inside portion comprising a plurality of heat exchangers in fluid communication with the one or more than one through hole of the graphite moderator core,
each heat exchanger having an inlet conduit and an outlet conduit, each inlet conduit and each outlet conduit extending from each respective heat exchanger, through the vessel, toward the outside portion of the heat exchanger system and connecting each respective heat exchanger to the outside portion of the heat exchanger system, each heat exchanger having associated thereto a respective radioactivity detector, each radioactivity detector arranged to detect radioactivity present in a coolant salt circulating in the respective heat exchanger, each shutoff mechanism arranged to shut off circulation of the coolant salt circulating in the respective heat exchanger when radioactivity beyond a threshold amount is detected, by the respective radioactivity detector, in the respective heat exchanger.

3. The nuclear power plant of claim 1, wherein the molten salt is a molten fuel salt, the nuclear power plant further comprising a pump system to pump the molten fuel salt through the heat exchanger system and through the one or more than one through hole of the graphite moderator core, the heat exchangers being arranged in the heat exchanger unit to have the molten fuel salt flow thereon.

4. The nuclear reactor plant of claim 1 further comprising a pressure monitoring system positioned outside the vessel, the pressure monitoring system arranged to monitor a pressure of the coolant salt circulating in each of the heat exchangers, each shutoff mechanism arranged to shut off circulation of the coolant salt circulating in the respective heat exchanger when the pressure monitoring system detects a pressure change in the respective heat exchanger.

5. The nuclear power plant of claim 1 wherein each respective heat exchanger has an inlet conduit and an outlet conduit, each respective radioactivity detector of each respective heat exchanger being arranged to detect radioactivity present in the coolant salt passing through at least one of the inlet conduit and the outlet conduit.

6. The nuclear power plant of claim 2 wherein each respective radioactivity detector of each respective heat exchanger being arranged to detect radioactivity present in the coolant salt passing through at least one of the inlet conduit and the outlet conduit.

7. The nuclear power plant of claim 2 wherein the shutoff mechanism of each respective heat exchanger is arranged to shut off a flow of the coolant salt in each of the inlet conduit and the outlet conduit.

8. The nuclear power plant of claim 7 wherein each shutoff mechanism includes a crimping system to crimp the inlet conduit and to crimp the outlet conduit.

9. The nuclear power plant of claim 7 wherein each shutoff mechanism includes an inlet conduit shutoff valve arranged on the inlet conduit and an outlet conduit shutoff valve arranged on the outlet conduit.

10. The nuclear power plant of claim 2 wherein the vessel further comprising a neutron reflector positioned therein, between the plurality of heat exchangers and the graphite moderator core, the neutron reflector defining at least one aperture fluidly connecting the heat exchanger unit and the graphite moderator core.

11. The nuclear power plant of claim 1 wherein at least one heat exchanger is positioned in the vessel, the vessel further comprising a neutron reflector positioned therein, between the at least one heat exchanger and the graphite neutron moderator core, the neutron reflector defining at least one aperture fluidly connecting the heat exchanger unit and the graphite neutron moderator core.

12. The nuclear power plant of claim 1 wherein the shutoff mechanisms further comprise sever mechanisms to physically sever each inlet conduit and outlet conduit to allow sequestration of the vessel and any segments of inlet conduits and outlet conduits attached to the vessel.

13. A nuclear power plant comprising:
an integral molten salt reactor (IMSR) comprising:
a vessel, the vessel comprising:
a graphite moderator core, the graphite moderator core defining one or more than one through hole;
a molten salt circulating within the vessel and within the one or more than one through hole, the molten salt for receiving heat produced by the IMSR; and
heat exchangers, each heat exchanger defining a volume;
conduits connecting the heat exchangers to an outside the vessel and to an end use system, each conduit comprising a coolant salt circulating within, the coolant salt for receiving heat from the molten salt and providing the heat to the end use system located at the outside of the vessel, the conduits comprising inlet conduits and outlet conduits, each heat exchanger having connected thereto an inlet conduit and an outlet conduit, the inlet conduit to circulate coolant salt away from the heat exchanger to which it is connected, the outlet conduit to circulate coolant salt toward the heat exchanger to which it is connected;
radioactivity detectors, each radioactivity detector having associated thereto a respective heat exchanger;
pressure detectors; and
shutoff mechanisms, each inlet conduit having associated thereto a respective shutoff mechanism, each outlet conduit having associated thereto a respective shutdown mechanism, each radioactivity detector for detecting radioactivity present in the coolant salt circulating in the heat exchanger associated to the respective radioactivity detector, at least one of the inlet conduit and the outlet conduit of each heat exchanger having a respective pressure detector connected thereto, each pressure detector for monitoring pressure of the coolant salt in the inlet conduit or the outlet conduit to which the pressure detector is connected, the shutoff mechanisms to shut off circulation of the coolant salt within the inlet conduit and the outlet conduit of a particular heat exchanger when at least one of:
(a) the radioactivity in the particular heat exchanger exceeds a pre-determined threshold amount, and
(b) the pressure in the at least one of the inlet conduit and the outlet conduit of the particular heat exchanger changes, wherein in the event that the shutoff mechanism shuts down the particular heat exchanger, the remaining heat exchangers still function and the IMSR continues to operate.

14. The nuclear power plant of claim 13 further comprising a pump system to pump the coolant salt through the one or more than one heat exchanger.

15. The nuclear power plant of claim 13 wherein the shutoff mechanism includes a crimping system to crimp the inlet conduit or outlet to which the shutoff mechanism is associated, or a shutoff valve connected to an inlet conduit or an outlet conduit, the shutoff valve to shut off circulation of the coolant salt circulating in the inlet conduit or the outlet conduit to which the shutoff valve is connected.

16. The nuclear power plant of claim 13, wherein the vessel further comprises a neutron reflector positioned between the heat exchangers and the graphite moderator core, the neutron reflector defining at least one aperture configured to have the molten salt flow therethrough, between the graphite moderator core and the volume defined by each heat exchanger.

17. The nuclear power plant of claim 13, wherein the vessel further comprises a baffle structure positioned between the heat exchangers and the graphite moderator core, the baffle structure to guide the molten salt to flow downwards along an outside periphery of the graphite moderator core.

18. The nuclear power plant of claim 13, wherein the vessel further comprises a control rod.

19. The nuclear power plant of claim 13, wherein the number of heat exchangers ranges from one to six.

\* \* \* \* \*